US009092717B2

(12) United States Patent
Shiraishi

(10) Patent No.: US 9,092,717 B2
(45) Date of Patent: Jul. 28, 2015

(54) DATA PROCESSING DEVICE AND DATA PROCESSING METHOD

(71) Applicant: Naoto Shiraishi, Kanagawa (JP)

(72) Inventor: Naoto Shiraishi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/073,063

(22) Filed: Nov. 6, 2013

(65) Prior Publication Data

US 2014/0139858 A1 May 22, 2014

(30) Foreign Application Priority Data

Nov. 16, 2012 (JP) ................. 2012-252621

(51) Int. Cl.
G06K 9/00 (2006.01)
G06K 9/36 (2006.01)
G06K 9/46 (2006.01)
G06K 15/00 (2006.01)
H04N 1/00 (2006.01)
H04N 1/40 (2006.01)
H04N 1/403 (2006.01)
H04N 1/405 (2006.01)
H04N 1/41 (2006.01)
G06K 15/02 (2006.01)
H04N 1/64 (2006.01)

(52) U.S. Cl.
CPC ........ *G06K 15/1849* (2013.01); *G06K 15/1865* (2013.01); *H04N 1/64* (2013.01)

(58) Field of Classification Search
USPC .............. 358/2.99, 1.9, 1.16, 1.17, 1.13, 448, 358/539, 1.18, 3.03, 3.06, 518, 530, 2.1, 358/3.2, 426.03, 426.06; 382/232, 246, 382/251, 233, 238, 299, 166, 245, 244, 382/247; 711/154, 206, 173; 341/87, 51; 717/115
See application file for complete search history.

(56) References Cited

U.S. PATENT DOCUMENTS

| | | | | |
|---|---|---|---|---|
| 5,442,459 A * | 8/1995 | Gahang | .................... | 358/426.02 |
| 6,157,743 A * | 12/2000 | Goris et al. | .................... | 382/233 |
| 6,219,454 B1 * | 4/2001 | Kawano et al. | ............... | 382/232 |
| 6,222,943 B1 * | 4/2001 | Suga | .............................. | 382/239 |
| 6,538,771 B1 * | 3/2003 | Sakatani et al. | ............... | 358/2.1 |
| 6,744,929 B1 * | 6/2004 | Okada | ........................... | 382/251 |
| 7,221,483 B2 * | 5/2007 | Yagishita et al. | ............ | 358/3.13 |
| 7,227,999 B2 * | 6/2007 | Schwartz | ...................... | 382/233 |

(Continued)

FOREIGN PATENT DOCUMENTS

JP 2003-264703 9/2003

*Primary Examiner* — Jonathan R Beckley
(74) *Attorney, Agent, or Firm* — Harness, Dickey & Pierce, P.L.C.

(57) ABSTRACT

A data processing device includes: a data reading unit that reads a predetermined amount of data; a data-period selection unit that selects a data period in units of the predetermined amount of data; a data clipping unit that clips data from the read data with the data period; an intermediate-data conversion unit that converts the clipped data into intermediate data; and a coding processing unit that codes the intermediate data. The data-period selection unit has a match count unit that obtains count values of matches in data between pieces of divided data that are obtained by dividing the read data in units of respective predetermined periods, and selects one of the periods of divided data that provides largest one of the count values of matches or selects, when some of the count values are the same, largest one of the periods that provide the same count value.

10 Claims, 27 Drawing Sheets

(56) References Cited

U.S. PATENT DOCUMENTS

| | | | |
|---|---|---|---|
| 7,936,932 B2* | 5/2011 | Bashyam et al. | 382/232 |
| 8,599,918 B2* | 12/2013 | Yoshida et al. | 375/240.12 |
| 8,934,727 B2* | 1/2015 | Shiraishi | 382/232 |
| 2001/0007595 A1* | 7/2001 | Mishima | 382/232 |
| 2002/0075532 A1 | 6/2002 | Shiraishi | |
| 2003/0053701 A1 | 3/2003 | Shiraishi | |
| 2003/0063813 A1 | 4/2003 | Shiraishi | |
| 2004/0131267 A1* | 7/2004 | Adiletta et al. | 382/236 |
| 2005/0151991 A1 | 7/2005 | Shiraishi | |
| 2005/0207667 A1 | 9/2005 | Shiraishi | |
| 2005/0249427 A1 | 11/2005 | Shiraishi | |
| 2006/0072142 A1 | 4/2006 | Shiraishi | |
| 2006/0193528 A1 | 8/2006 | Shiraishi | |
| 2007/0115506 A1* | 5/2007 | Yada | 358/3.06 |
| 2009/0060325 A1 | 3/2009 | Shiraishi | |
| 2009/0128857 A1 | 5/2009 | Shiraishi | |
| 2011/0228325 A1 | 9/2011 | Shiraishi | |
| 2011/0273736 A1 | 11/2011 | Shiraishi | |
| 2011/0280492 A1 | 11/2011 | Shiraishi | |
| 2012/0155779 A1 | 6/2012 | Shiraishi | |
| 2012/0162715 A1 | 6/2012 | Shiraishi | |
| 2012/0320389 A1 | 12/2012 | Shiraishi | |
| 2013/0094037 A1 | 4/2013 | Shiraishi | |
| 2013/0155466 A1 | 6/2013 | Shiraishi | |
| 2013/0176590 A1 | 7/2013 | Shiraishi | |

* cited by examiner

FIG.3

| CODE NAME | CODE TABLE | CODE SIZE TABLE |
|---|---|---|
| ESC | 0b000_ESC (8 BIT) | 11 |
| | 0b000_ESC (16 BIT) | 19 |
| | 0b000_ESC (32 BIT) | 35 |
| INDEX 00 | 0b001 | 3 |
| INDEX 01 | 0b010 | 3 |
| INDEX 02 | 0b011 | 3 |
| INDEX 03 | 0b1000 | 4 |
| INDEX 04 | 0b1001 | 4 |
| INDEX 05 | 0b110100 | 6 |
| INDEX 06 | 0b110101 | 6 |
| INDEX 07 | 0b110110 | 6 |
| INDEX 08 | 0b110111 | 6 |
| INDEX 09 | 0b1110000 | 7 |
| INDEX 10 | 0b1110001 | 7 |
| INDEX 11 | 0b1110010 | 7 |
| INDEX 12 | 0b1110011 | 7 |
| INDEX 13 | 0b1110100 | 7 |
| INDEX 14 | 0b1110101 | 7 |
| INDEX 15 | 0b1110110 | 7 |
| LINE HEADER | 0b1111000 (8 BIT) | 7 |
| | 0b1111001 (16 BIT) | 7 |
| | 0b1111010 (32 BIT) | 7 |
| CODE END | 0b11111 | 5 |

FIG.4

| DICTIONARY DATA | INDEX |
|---|---|
| 0x0123_0000 | 0 |
| 0x4567_0000 | 1 |
| 0x89AB_0000 | 2 |
| 0xCDEF_0000 | 3 |
| 0x3210_0000 | 4 |
| 0x7654_0000 | 5 |
| 0xBA98_0000 | 6 |
| 0xFEDC_0000 | 7 |
| 0x0000_0000 | 8 |
| 0x1111_0000 | 9 |
| 0x2222_0000 | 10 |
| 0x3333_0000 | 11 |
| 0x4444_0000 | 12 |
| 0x5555_0000 | (13) |
| 0x6666_0000 | 14 |
| 0x7777_0000 | 15 |

INPUT DATA
0x5555_0000

OUTPUT SYMBOL

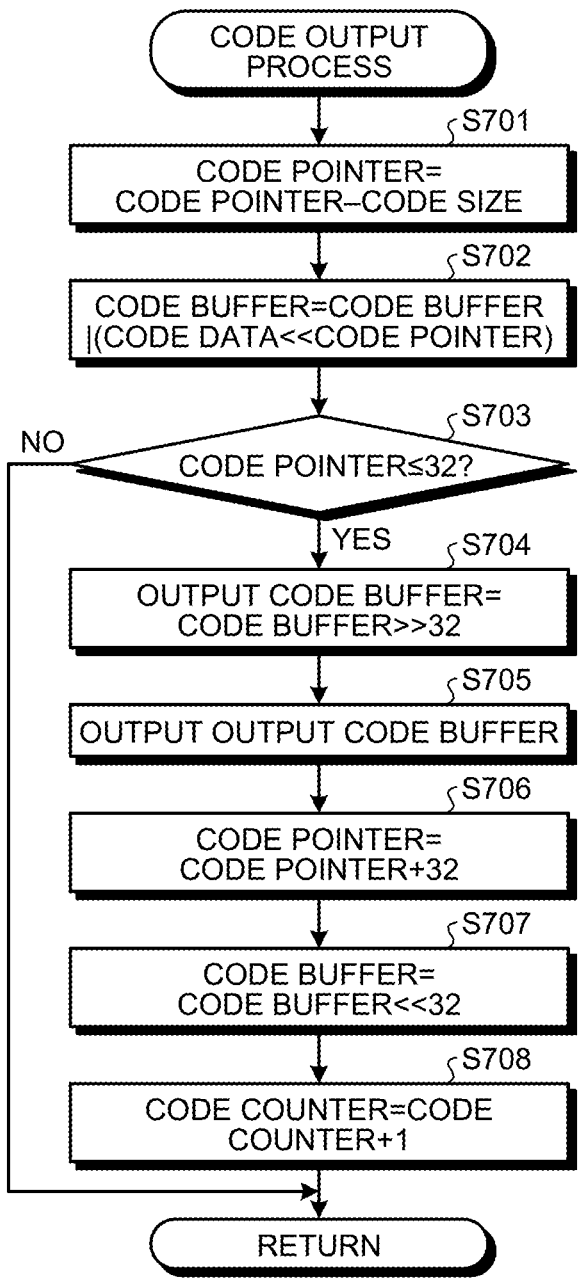

FIG.26

| 1-LINE IMAGE DATA (0) |
| 1-LINE IMAGE DATA (1) |
| 1-LINE IMAGE DATA (2) |
| 1-LINE IMAGE DATA (3) |
| ⋮ |
| 1-LINE IMAGE DATA (N) |

● EXAMPLE OF IMAGE DATA

FIG.27

| LINE HEADER CODE (0) | LINE CODE DATA (0) |
| LINE HEADER CODE (1) | LINE CODE DATA (1) |
| LINE HEADER CODE (2) | LINE CODE DATA (2) |
| LINE HEADER CODE (3) | LINE CODE DATA (3) |
| ⋮ | |
| LINE HEADER CODE (n) | LINE CODE DATA (N) |
| CODE END (n) | |

● EXAMPLE OF CODE

FIG.31

| DICTIONARY DATA | INDEX |
|---|---|
| 0x5555_0000 | 0 |
| 0x0123_0000 | 1 |
| 0x4567_0000 | 2 |
| 0x89AB_0000 | 3 |
| 0xCDEF_0000 | 4 |
| 0x3210_0000 | 5 |
| 0x7654_0000 | 6 |
| 0xBA98_0000 | 7 |
| 0xFEDC_0000 | 8 |
| 0x0000_0000 | 9 |
| 0x1111_0000 | 10 |
| 0x2222_0000 | 11 |
| 0x3333_0000 | 12 |
| 0x4444_0000 | 13 |
| 0x5555_0000 | 14 |
| 0x6666_0000 | 15 |

INPUT DATA 0x5555_0000

| | 8-BIT PERIOD MATCH COUNT | 16-BIT PERIOD MATCH COUNT | 32-BIT PERIOD MATCH COUNT | MAX PERIOD |
|---|---|---|---|---|
| WITHOUT QUANTIZATION | 710 | 650 | 560 | 8-BIT PERIOD |
| 8-BIT QUANTIZATION | 512 | 512 | 512 | 32-BIT PERIOD |
| 7-BIT QUANTIZATION | 640 | 640 | 512 | 16-BIT PERIOD |
| 6-BIT QUANTIZATION | 704 | 640 | 512 | 8-BIT PERIOD |

DATA PROCESSING DEVICE AND DATA PROCESSING METHOD

CROSS-REFERENCE TO RELATED APPLICATIONS

The present application claims priority to and incorporates by reference the entire contents of Japanese Patent Application No. 2012-252621 filed in Japan on Nov. 16, 2012.

BACKGROUND OF THE INVENTION

1. Field of the Invention

The present invention relates to a data processing device, a data processing method, and a computer program product.

2. Description of the Related Art

An image processing device such as a printer device temporarily stores image data in a memory. In this case, if the image data is stored in the memory as it is, a large-capacity memory is required, resulting in high cost. To address this, the image data is conventionally compressed and stored in the memory.

A print processing procedure in a conventional image processing device is performed as follows, for example. That is, an image formation device analyzes data in page descript language (PDL) received from a network and generates data in an intermediate language that is executable by a drawing device, and then the drawing device analyzes the data in the intermediate language to draw an image in a band memory. To draw an image in the band memory, the image formation device codes the image according to an image compression algorithm, stores the code in the memory, then at the time of printing, reads the coded data from the band memory with delays corresponding to cyan (C), magenta (M), yellow (Y), and black (K) plates, decodes the coded data according to the compression algorithm, transfers the decoded data corresponding to the C, M, Y, and K plates to a printer engine to print.

As a method for efficiently compressing data, Japanese Patent No. 4000266 describes a data coding method in which small dynamic dictionary is controlled according to a Move-To-Front (MTF) method, thereby executing an MTF control with a small dictionary and subjecting index values according to match with the dictionary, to run-length encoding.

With this method, however, a small number of words are registered in the dictionaries. Thus, for example, when the data width of a dictionary used for coding is 1 byte (=8 bits) and the depth of the dictionary is $64=2^6$ pieces, only conversion of 8 bytes into 6 bytes is achieved even if target data matches the dictionary. Accordingly, the number of words in the dictionary needs to be increased. However, in this case, the match becomes hard to occur using the dictionary.

Therefore, in the data coding method described in Japanese Patent No. 4000266, for example, image data that is subjected to a halftone process such as dithering at 1 bit/pixel is used as input data and period detection is performed in units of one line using the fact that image data having been subjected to the dithering originally has periodicity, to determine the number of words in the dictionary. However, because a white image in which nothing is written (which occupies a large area in a printer image) basically has no periodicity, no period can be determined.

In the data coding method described in Japanese Patent No. 4000266, matches with words in the dictionary are counted with each of plural periods and a period with which the count value is the largest is used. However, in the case of a white image in which nothing is written, the image has no periodicity and thus a match counter for the shortest period is likely to have the largest value.

In a printer image, because different dithering patterns (dithering patterns having different sizes) are used for different attributes (such as the character, the photograph, and the graphic), it is difficult to determine a period in a line in which the character, the photograph, and the like exist together (FIG. 28 is an example in which a photographic image, a character image, and a graphic image exist together in one line) and thus the count value of a match counter for the shortest period is likely to be largest as in the case of a white image in which nothing is written. In this case, the period having the smallest value is selected and the speed of the compression device is decreased because the compression is performed using the dictionary in units of the period.

In view of the above, there is a need to code data with as long a period as possible among periods with which input data and dictionary data matches the most, thereby further increasing the coding rate.

SUMMARY OF THE INVENTION

It is an object of the present invention to at least partially solve the problems in the conventional technology.

A data processing device that codes data, includes: a data reading unit that reads a predetermined amount of data stored in a data storage unit; a data-period selection unit that selects a data period for the data in units of the predetermined amount of data with respect to the read data; a data clipping unit that clips data from the read data with the data period selected by the data-period selection unit; an intermediate-data conversion unit that converts the clipped data into intermediate data; and a coding processing unit that codes the intermediate data converted by the intermediate-data conversion unit. The data-period selection unit has a match count unit that obtains count values of matches in data between pieces of divided data that are obtained by dividing the read data in units of respective predetermined periods, and selects one of the periods of divided data that provides largest one of the count values of matches obtained by the match count unit or selects, when some of the count values are the same, largest one of the periods that provide the same count value.

A data processing method performed in a data processing device that codes data, includes: a data reading step of reading a predetermined amount of data stored in a data storage unit; a data-period selection step of selecting a data period for the data in units of the predetermined amount of the data with respect to the read data; a data clipping step of clipping data from the read data with the data period selected at the data-period selection step; an intermediate-data conversion step of converting the clipped data into intermediate data; and a coding processing step of coding the intermediate data converted at the intermediate-data conversion step. The data-period selection step includes a match count step of obtaining count values of matches in data between respective pieces of divided data that are obtained by dividing the read data in units of respective predetermined periods and includes selecting one of the periods of divided data that provides largest one of the count values of matches obtained at the match count step or selecting, when some of the count values are same, selecting largest one of the periods that provide the same count value.

A computer program product comprises a non-transitory computer-usable medium having computer-readable program codes embodied in the medium. The program codes when executed causes a computer to execute a data processing method performed in a data processing device that codes data. The data processing method includes: a data reading step of reading a predetermined amount of data stored in a data storage unit; a data-period selection step of selecting a data period for the data in units of the predetermined amount of the data with respect to the read data; a data clipping step of clipping data from the read data with the data period selected at the data-period selection step; an intermediate-data conversion step of converting the clipped data into intermediate data; and a coding processing step of coding the intermediate data converted at the intermediate-data conversion step. The data-period selection step includes a match count step of obtaining count values of matches in data between respective pieces of divided data that are obtained by dividing the read data in units of respective predetermined periods and includes selecting one of the periods of divided data that provides largest one of the count values of matches obtained at the match count step or selecting, when some of the count values are same, selecting largest one of the periods that provide the same count value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 depicts a format of obtained codes;

FIG. 4 depicts a dictionary searching process in an MTF coding process at the time of coding performed when the MTF data width is 16 bits;

FIG. 25A is a flowchart of a procedure of a code output process of outputting variable length codes as 32-bit codes;

FIG. 26 depicts image data to be coded;

FIG. 27 is an example of obtained codes;

FIG. 31 depicts a dictionary updating process in a FIFO coding process at the time of coding when the MTF data width is 16 bits; and FIG. 32 is an example of the difference in the MAX period caused by changing the quantization value.

DETAILED DESCRIPTION OF THE PREFERRED EMBODIMENTS

Figure 1:
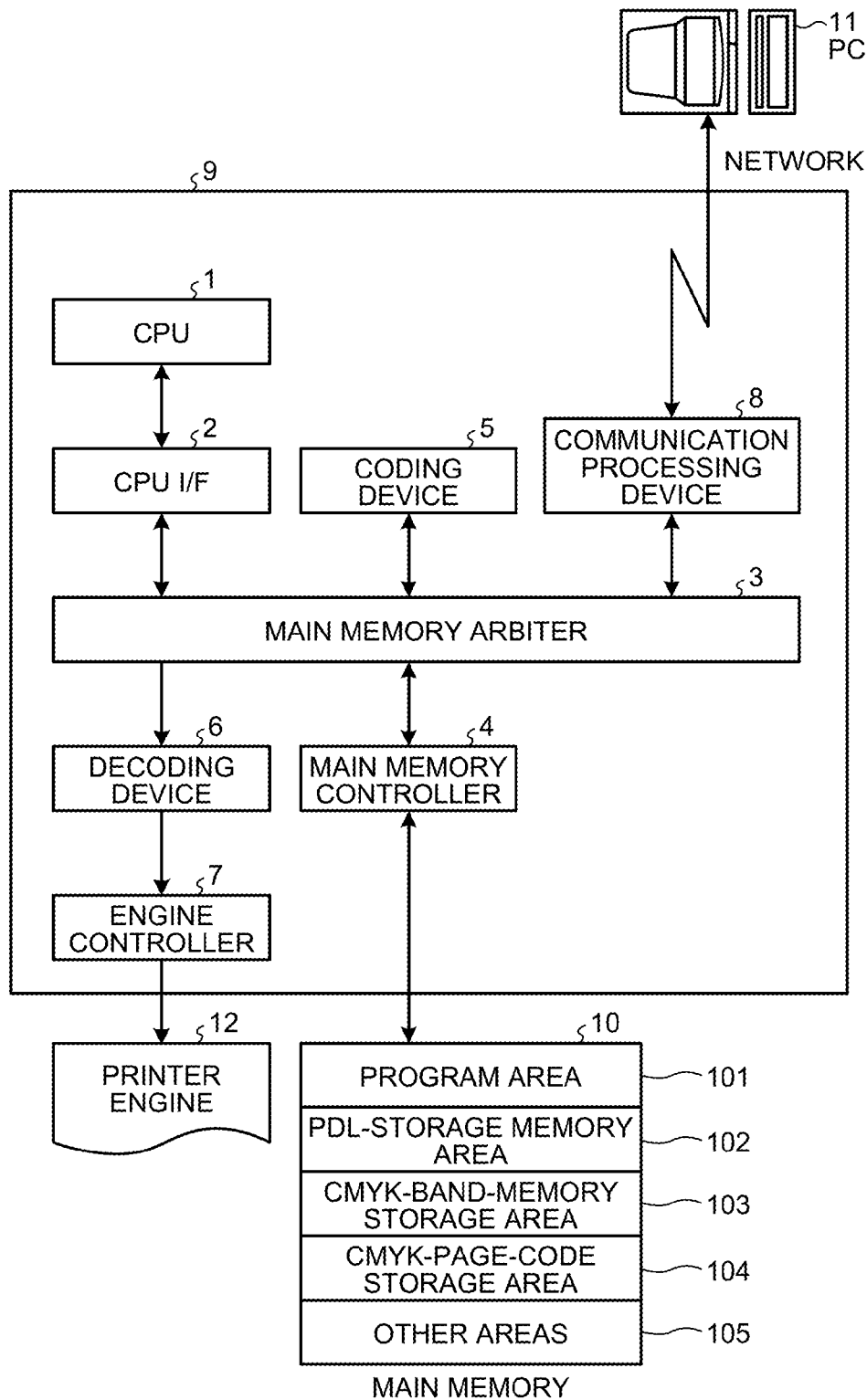
FIG. 1 is a block diagram of an electric control device of a printer of an image-data processing device that is an embodiment of a data processing device according to the present invention.

FIG. 1 is a block diagram of an electric control device 9 of a printer of an image-data processing device that is an embodiment of a data processing device according to the present invention.

A central processing unit (CPU) 1 analyzes data in PDL obtained from a personal computer (PC) 11 and performs a process of drawing multivalued (CMYK) image data into a main memory 10. A CPU interface (I/F) 2 is connected to a main memory arbiter (or a main memory ARB) 3 and performs I/F processing between the CPU 1 and a main memory controller 4.

The main memory arbiter 3 controls access of the CPU 1, a communication processing device 8, the main memory controller 4, a coding device 5, a decoding device 6, and the like to the main memory 10.

The main memory controller 4 controls the main memory 10.

The coding device 5 reads multivalued (CMYK) band data from the main memory 10, generates a code, and transfers the generated code to a CMYK-page-code storage area 104.

The decoding device 6 reads a coded CMYK page code in the main memory 10, decodes the code, and transfers the decoded data to an engine controller 7.

The engine controller 7 controls a printer engine 12. The communication processing device (or a communication controller) 8 is connected to the network to receive various data or commands from the network and is connected to various controllers via the main memory arbiter 3.

The main memory 10 includes a program area 101, a PDL-storage memory area 102, a CMYK-band-memory storage area 103, the CMYK-page-code storage area 104, and other areas 105, and stores therein image data, code data thereof, programs of the CPU, and the like.

The PC 11 creates data in a page descript language (PDL) and transfers the created data to a printer via the network.

Figure 2:
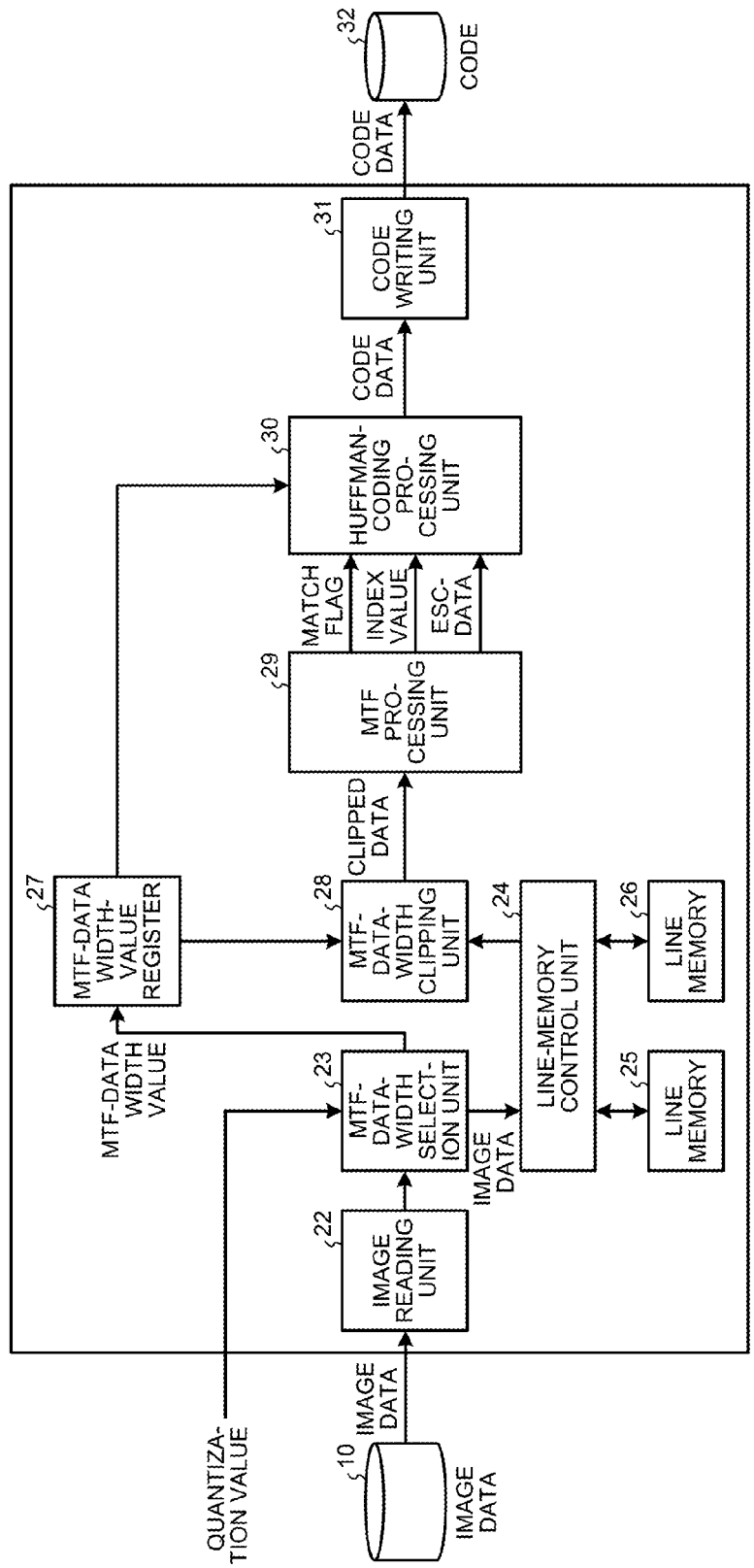
FIG. 2 is a functional block diagram for a coding process preformed by a coding device in FIG. 1.

FIG. 2 is a functional block diagram for a coding process preformed by the coding device 5 in FIG. 1.

Figure 6:
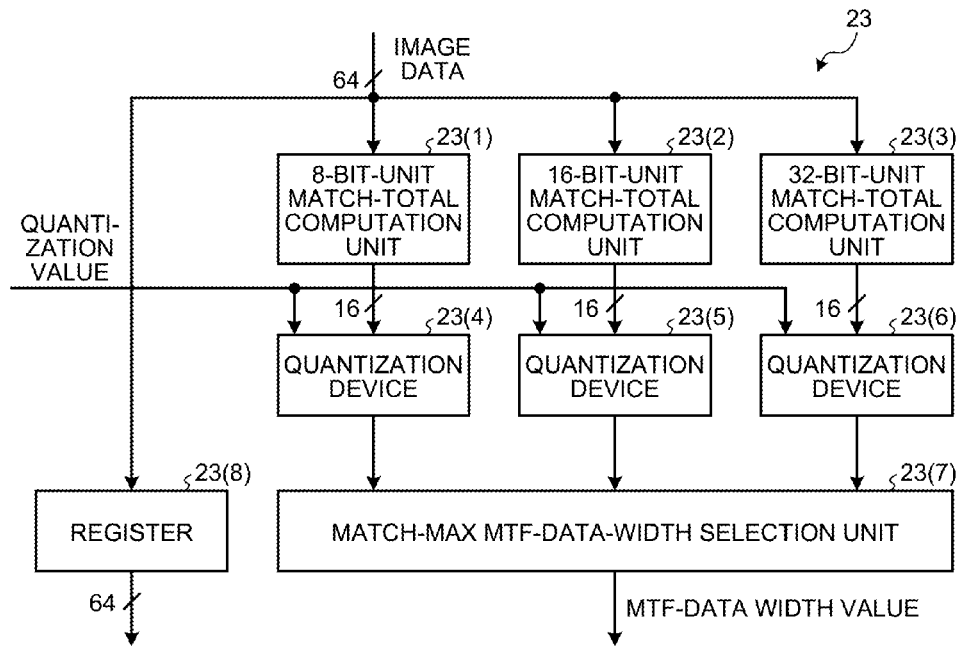
FIG. 6 is a block diagram of an MTF-data-width selection unit in FIG. 2.

As mentioned above, the main memory 10 stores therein data, image data in this case. A data reading unit, an image reading unit 22 in this case reads the image data from the main memory 10 in units of predetermined amounts, in units of one line in this case, and transfers the image data to a data-period selection unit, an MTF-data-width selection unit 23 in this case. The MTF-data-width selection unit (FIG. 6 is a block diagram of the MTF-data-width selection unit 23) receives the image data from the image reading unit 22 and transfers the image data to a line-memory control unit 24 while determining the number of matches with respect to each of a plurality of MTF data widths.

The line-memory control unit 24 receives the image data from the MTF-data-width selection unit 23 and writes the image data in line memories 25 and 26 included in a line-memory storage unit while alternately switching the line memories 25 and 26 in units of one line. The line memories 25 and 26 receive the image data in units of one line from the line-memory control unit 24 and store the received image data therein.

Figure 7:
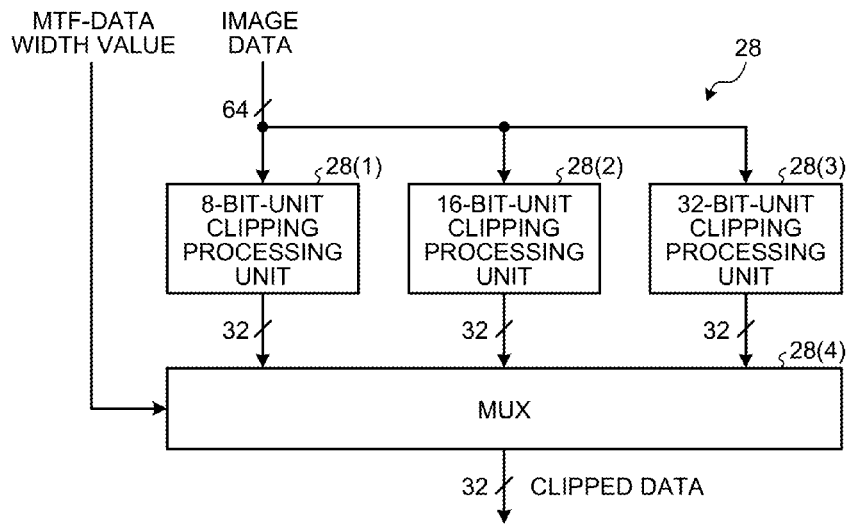
FIG. 7 is a block diagram of an MTF-data-width clipping unit in FIG. 2.

An MTF-data width-value register 27 that stores therein an MTF-data width value determined by the MTF-data-width selection unit 23. A data clipping unit, an MTF-data-width clipping unit 28 in this case (FIG. 7 is a block diagram of the MTF-data-width clipping unit 28) receives the image data from the line-memory control unit 24. The MTF-data-width clipping unit 28 clips the received image data with a width of the MTF-data width value stored in the MTF-data width-value register 27 and transfers the clipped data to an intermediate-data conversion unit, an MTF processing unit 29 in this case.

Figure 18:
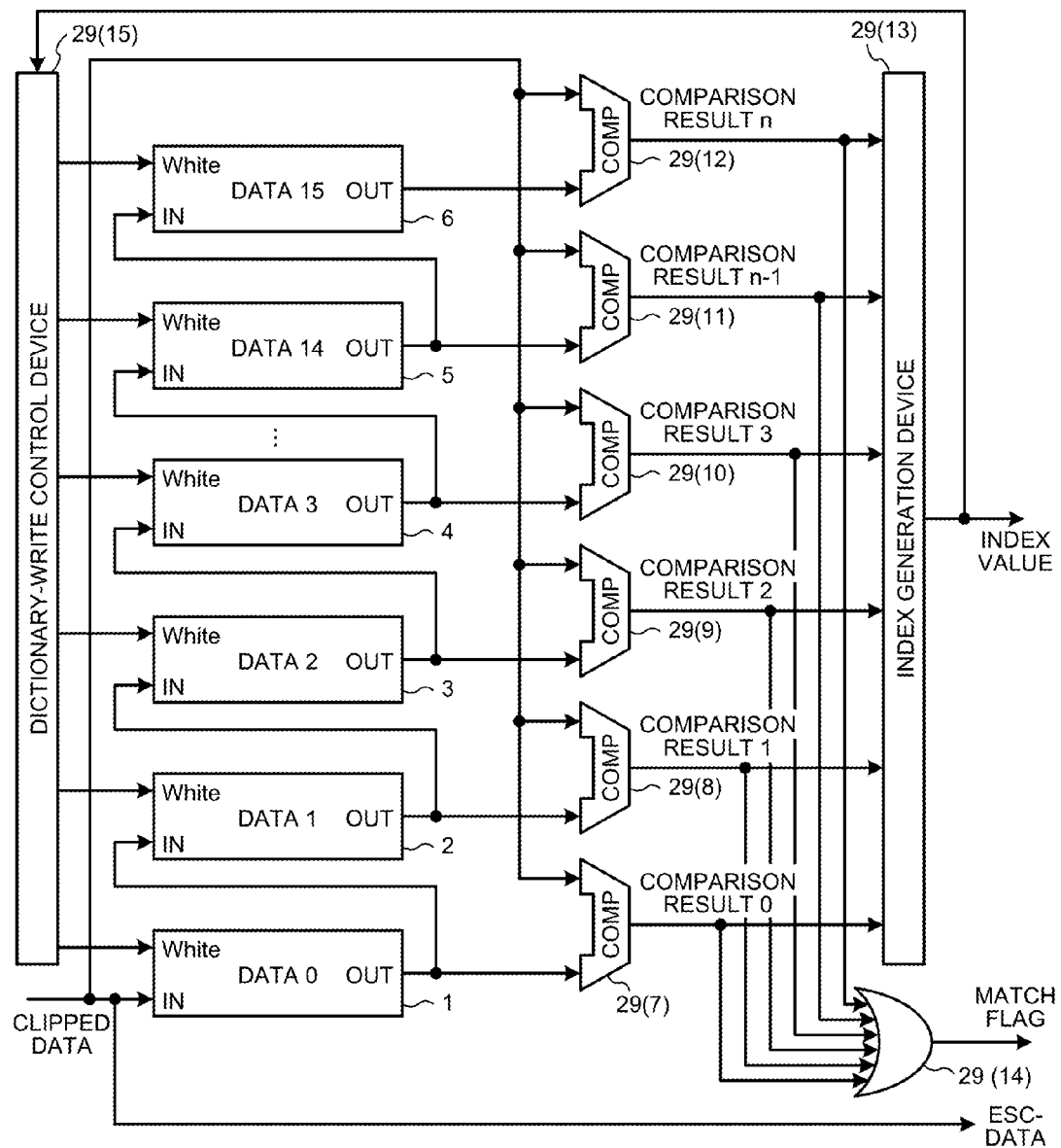
FIG. 18 is a block diagram of an MTF processing unit.

The MTF processing unit 29 receives the image data clipped by the MTF-data-width clipping unit 28 and generates a match FLAG, an index value, and Escape data (ESCDATA) (these are collectively referred to as "intermediate data" in this case) for identification in a code table shown in FIG. 3 according to an MTF algorithm and in order to generate a Huffman code in a Huffman-coding processing unit 30 at the next stage. That is, specifically, the MTF processing unit 29 compares the image data clipped by the MTF-data-width clipping unit 28 with the built-in dictionary and determines whether the match occurs. The MTF processing unit 29 transfers the index value of the match when a match occurs, while transfers the clipped data as an ESCDATA value when no match occurs, to a coding processing unit, the Huffman-coding processing unit 30 in this case as the intermediate data (FIG. 18 is a block diagram of the MTF processing unit 29).

Figure 20:
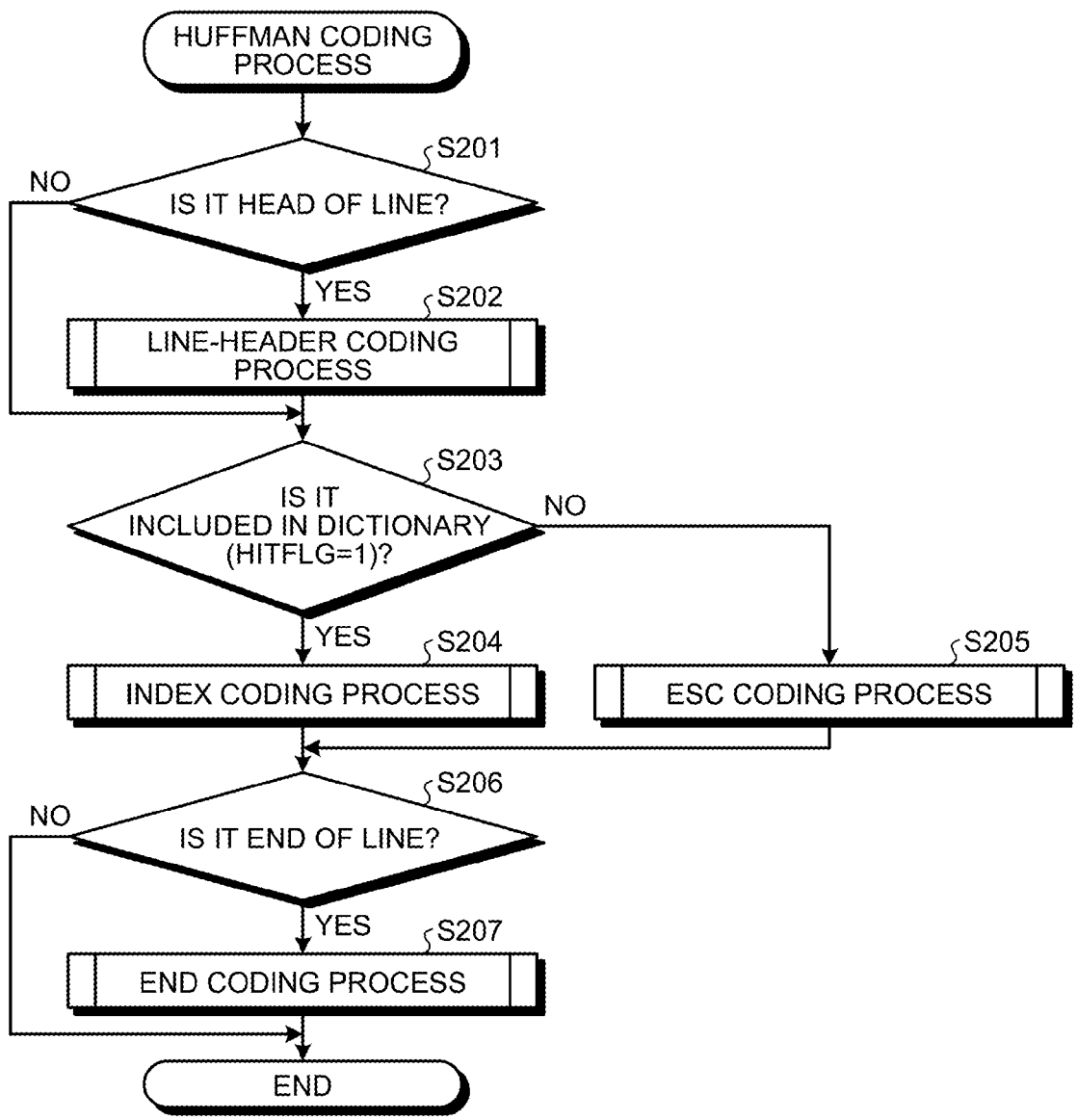
FIG. 20 is a flowchart of a Huffman-coding processing procedure performed in a Huffman-coding processing unit.

The Huffman-coding processing unit 30 codes the match FLAG (=1), the index value, and the ESCDATA value received from the MTF processing unit 29 according to a format shown in FIG. 3 and transfers the coded data to a code writing unit 31. FIG. 20 is a flowchart of a Huffman-coding processing procedure performed in the Huffman-coding processing unit 30.

The code writing unit 31 writes the code generated by the Huffman-coding processing unit 30 in a data storage unit, a memory 32 in this case, that stores therein code data (FIG. 26 depicts image data to be coded).

The image data in units of one line is coded in this way (FIG. 27 is an example of obtained codes). The image data is coded in units of one line and the coded image data includes a line header code at the head of each line and a code end at the end of the codes as shown in FIG. 27.

Each of the image reading unit 22, the MTF-data-width selection unit 23, the line-memory control unit 24, the MTF-data-width clipping unit 28, the MTF processing unit 29, the Huffman-coding processing unit 30, and the code writing unit 31 mentioned above is a function realizing unit that can be obtained by causing a computer to read program.

FIG. 3 depicts a format of obtained codes (a code format), including a code name, a code table, and a code size table.

The codes shown in FIG. 3 are variable-length Huffman codes and shorter codes are assigned in descending order of appearance frequencies in a Huffman tree.

In this case, a code-name line header is located at the head of a code of each line shown in FIG. 27 and indicates the beginning of the code of each line and a value of the MTF data width (8 bits, 16 bits, or 32 bits) of the code of the line. The code end indicates the end of the codes as shown in FIG. 27.

A code name ESC is for the clipped data that is not included in the dictionary at the time of MTF coding and is composed of an ESC header and raw data. The data width of the raw data depends on the MTF-data width value (8 bits, 16 bits, or 32 bits).

An index (INDEX) indicates a matching address (such as INDEX00) in the dictionary, which is input at the time of MTF coding, when the input data is in the dictionary.

FIG. 4 depicts a dictionary searching process in an MTF coding process at the time of coding performed when the MTF data width is 16 bits.

That is, the MTF-data-width clipping unit 28 shown in FIG. 2 successively clips data from data of one word (64 bits) in units of 16 bits in this case (which is the MTF-data width value). Because the MTF processing unit 29 shown in FIG. 2 is configured for 32 bits, which is the maximum value of the MTF data width, "0"s are added to 16 bits to cause the clipped data to be 32 bits.

In an example shown in FIG. 4, 16 bits of 0x0000 are added to 16 bits of input data 0x5555 to obtain 32 bits (0x5555_0000) to search the dictionary (0x0000 is added also to other data in the same way). In this case, the input data 0x5555_0000 matches dictionary data having an index value of 13 as shown in FIG. 4 and thus the MTF processing unit 29 outputs the match FLAG (=1) and the index value (=13). When the input data does not match the dictionary data, the MTF processing unit 29 outputs ESCDATA as already mentioned. In this way, the intermediate data reflects a match/mismatch of the input data with the dictionary data.

Figure 5:
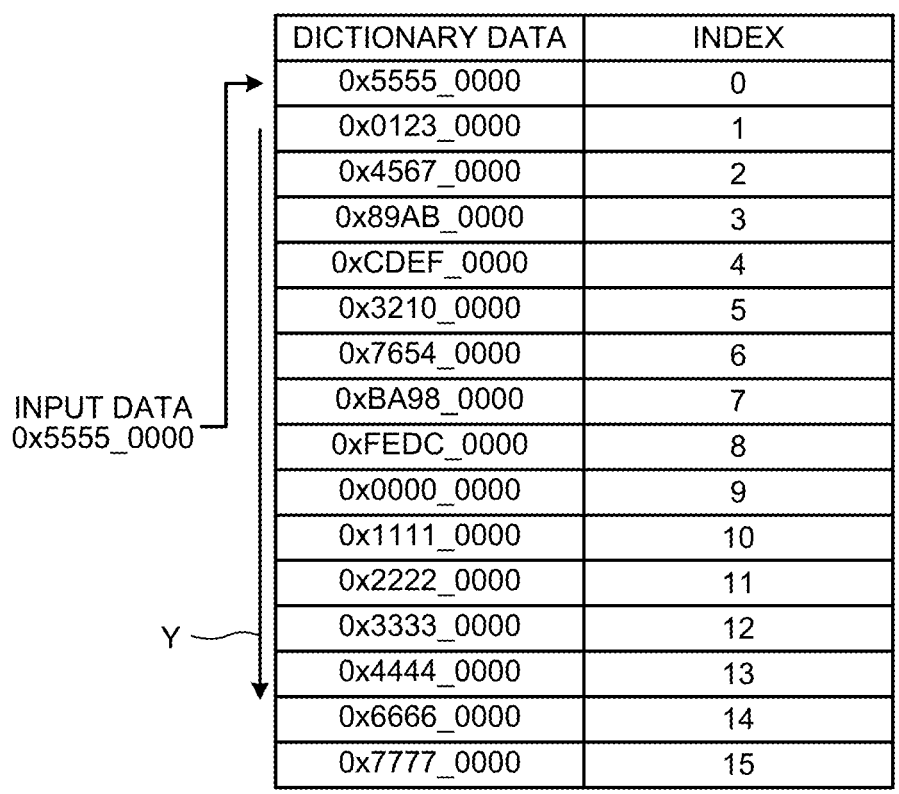
FIG. 5 depicts a dictionary updating process in an MTF coding process at the time of coding performed when the MTF data width is 16 bits.

FIG. 5 depicts a dictionary updating process in an MTF coding process at the time of coding performed when the MTF data width is 16 bits.

Because the input data 0x5555_0000 matches the data having the index value of 13 in FIG. 4, the dictionary data 0x5555_0000 having the index value of 13 is deleted and the input data 0x5555_0000 is inserted into the dictionary at an index value of 0 at the head as shown in FIG. 5 in the dictionary updating process. At the same time, dictionary data is shifted toward the position of the index value of the match (=13), as shown by an arrow Y in FIG. 5.

FIG. 6 is a block diagram of the MTF-data-width selection unit 23 in FIG. 2.

An 8-bit-unit match-total computation unit 23(1) divides data of one word (64 bits) with a predetermined period, in units of 8 bits in this case and determines the total count (number) of matches between adjacent pieces of divided data.

A 16-bit-unit match-total computation unit 23(2) divides data of one word (64 bits) with a predetermined period, in units of 16 bits in this case and determines the total count (number) of matches between adjacent pieces of divided data.

A 32-bit-unit match-total computation unit 23(3) divides data of one word (64 bits) with a predetermined period, in units of 32 bits in this case and determines the total count (number) of matches in data between adjacent pieces of divided data.

Figure 8:
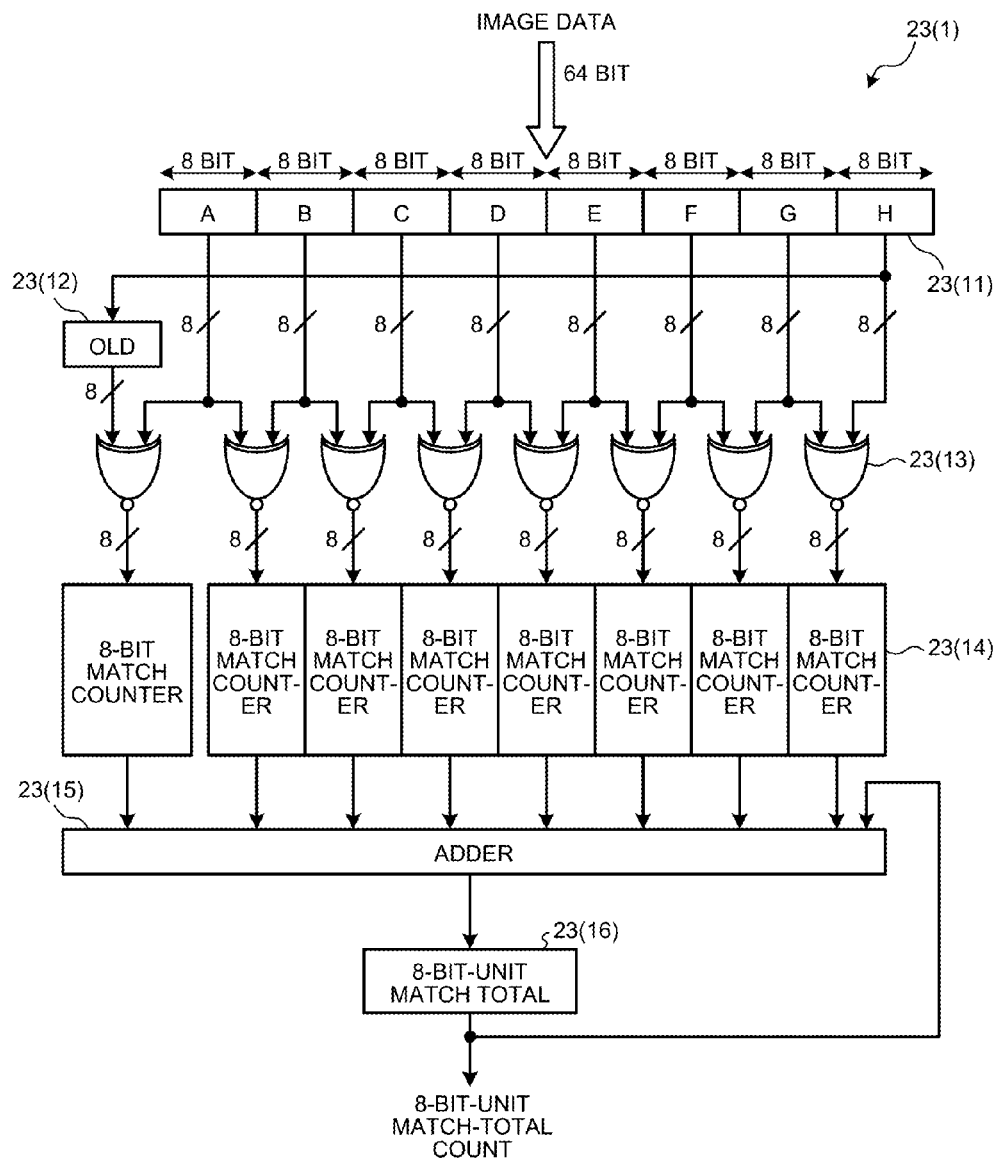
FIG. 8 is a block diagram of an 8-bit-unit match-total computation unit.
Figure 9:
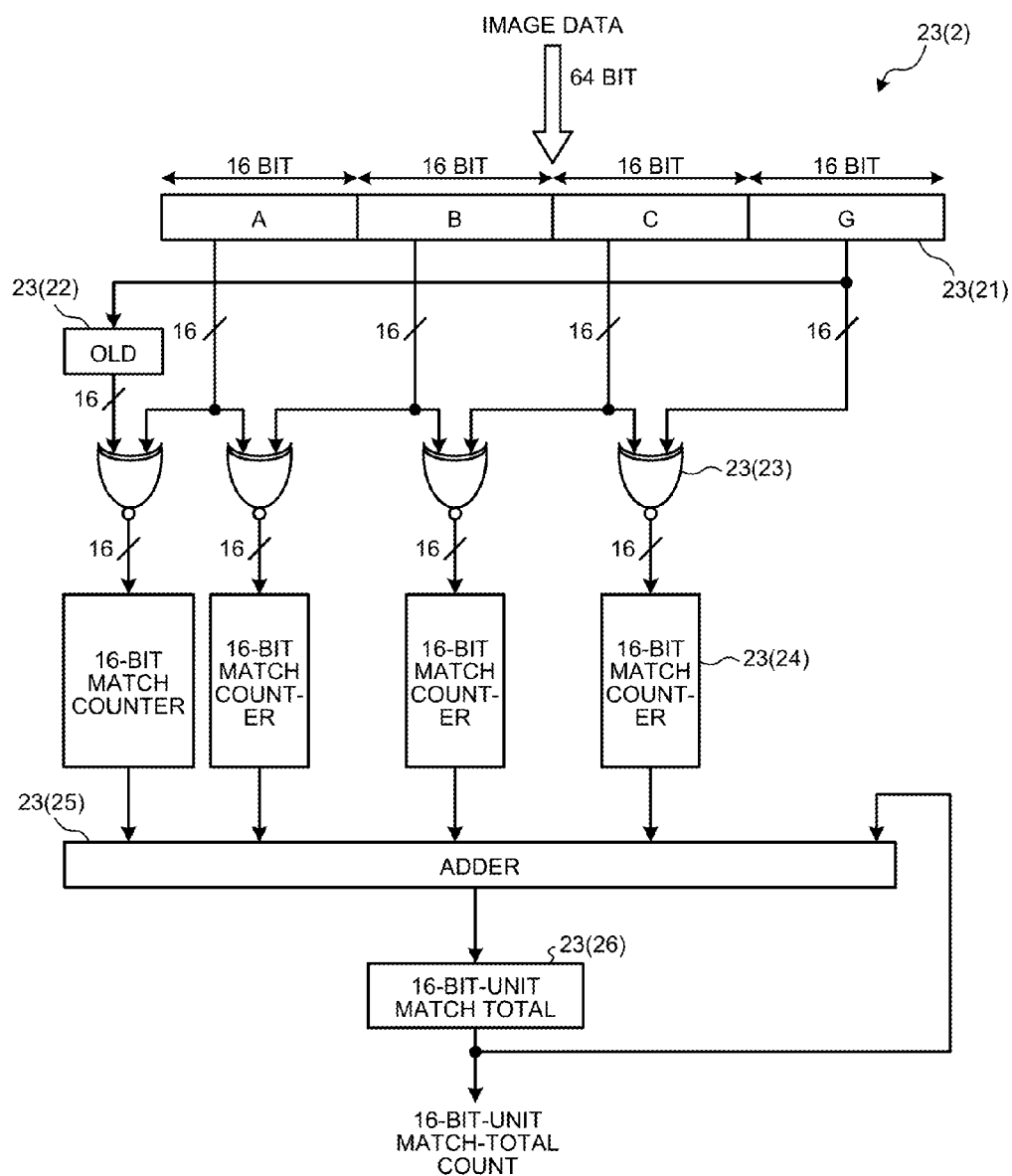
FIG. 9 is a block diagram of a 16-bit-unit match-total computation unit.
Figure 10:
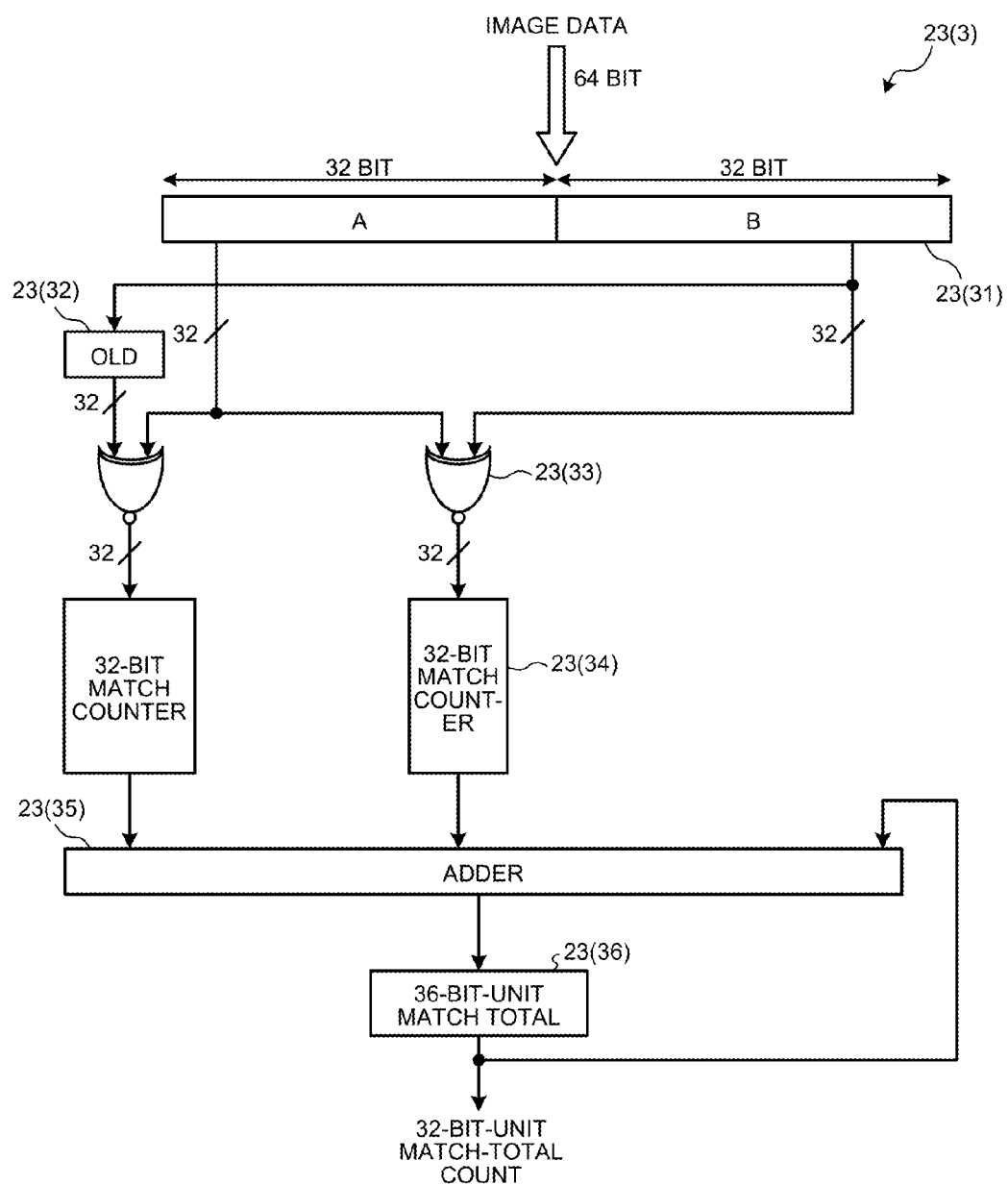
FIG. 10 is a block diagram of a 32-bit-unit match-total computation unit.

FIG. 8 is a block diagram of the 8-bit-unit match-total computation unit 23(1), FIG. 9 is a block diagram of the 16-bit-unit match-total computation unit 23(2), and FIG. 10 is a block diagram of the 32-bit-unit match-total computation unit 23(3).

Figure 11:
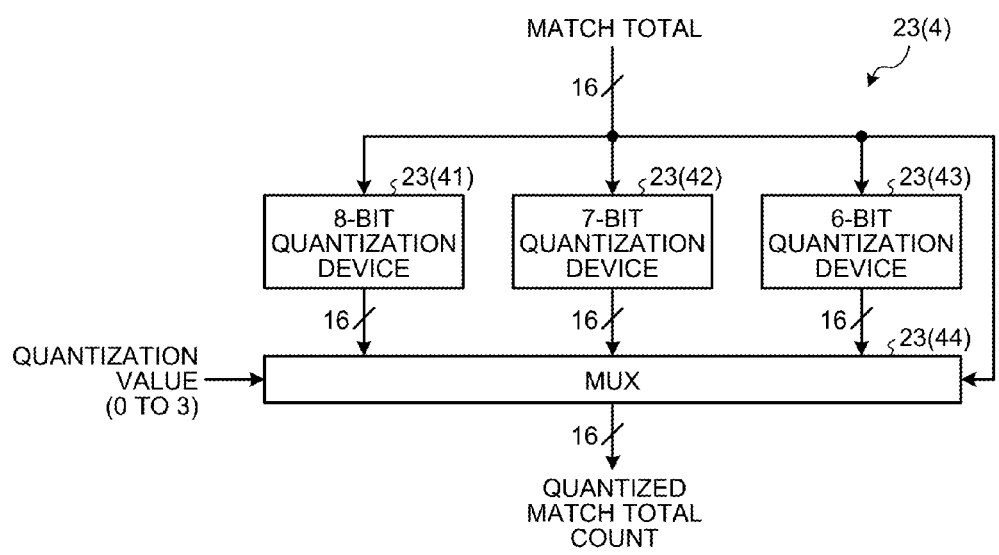
FIG. 11 is a block diagram of quantization devices in FIG. 6.

A quantization device 23(4), which is a quantization unit, quantizes the number of matches between adjacent pieces of data in units of 8 bits determined by the 8-bit-unit match-total computation unit 23(1) with a quantization value (quantization in this case means masking lower bits of the value of the match count. The same applies in the following descriptions). Similarly, a quantization device 23(5) quantizes the number of matches in data between adjacent pieces of data in units of 16 bits determined by the 16-bit-unit match-total computation unit 23(2) with a quantization value. A quantization device 23(6) quantizes the number of matches in data between adjacent pieces of data in units of 32 bits determined by the 32-bit-unit match-total computation unit 23(3) with a quantization value. FIG. 11 is a block diagram of the quantization devices 23(4), 23(5), and 23(6) mentioned above.

A match-Max MTF-data-width selection unit 23(7) selects an MTF data width with which, among the total counts of matches in data between adjacent pieces of data in units of respective bits determined by the quantization devices 23(4), 23(5), and 23(6), the maximum (Max) total count of matches is obtained.

A register 23(8) temporarily stores therein the read image data and transfers the image data to the line-memory control unit 24 in FIG. 2.

FIG. 7 is a block diagram of the MTF-data-width clipping unit 28 in FIG. 2.

Figure 15:
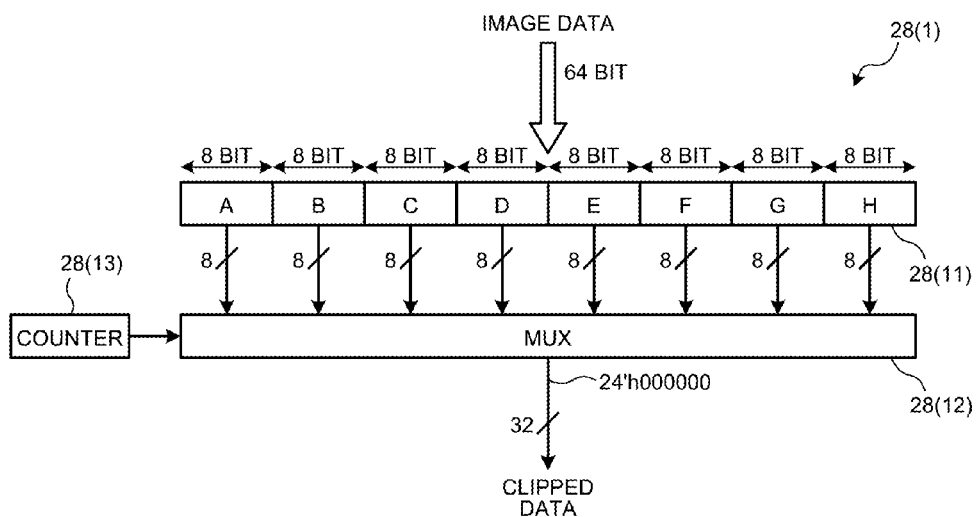
FIG. 15 is a block diagram of an 8-bit-unit clipping processing unit in FIG. 7.

An 8-bit-unit clipping processing unit 28(1) divides data of one word (64 bits) in units of 8 bits and clips the divided data. FIG. 15 is a block diagram of the 8-bit-unit clipping processing unit 28(1).

Figure 16:
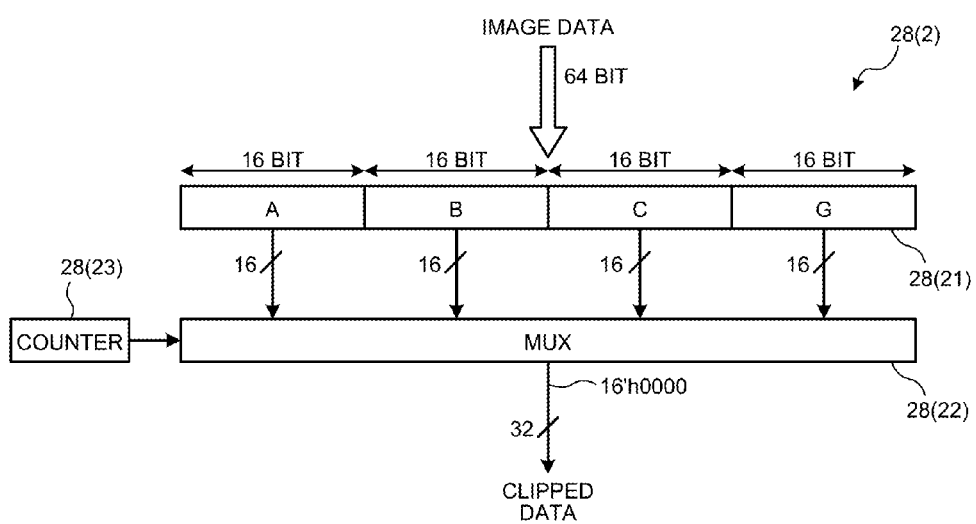
FIG. 16 is a block diagram of a 16-bit-unit clipping processing unit in FIG. 7.

A 16-bit-unit clipping processing unit 28(2) divides data of one word (64 bits) in units of 16 bits and clips the divided data. FIG. 16 is a block diagram of the 16-bit-unit clipping processing unit 28(2).

Figure 17:
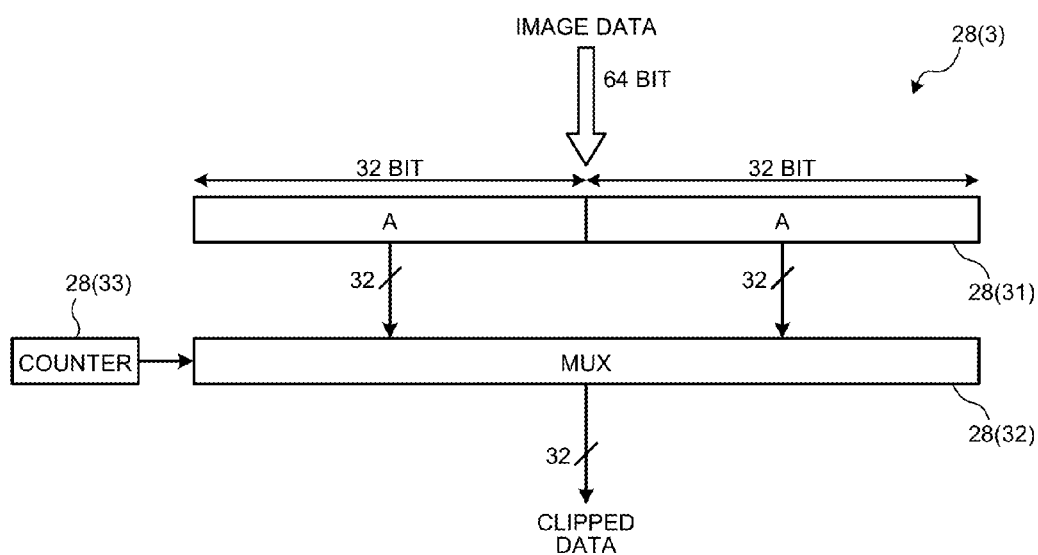
FIG. 17 is a block diagram of a 32-bit-unit clipping processing unit in FIG. 7.

A 32-bit-unit clipping processing unit 28(3) divides data of one word (64 bits) in units of 32 bits and clips the divided data. FIG. 17 is a block diagram of the 32-bit-unit clipping processing unit 28(3).

A multiplexer (MUX) 28(4) selects data clipped by the respective-bit-unit clipping processing units 28(1) to 28(3) according to the designated MTF-data width value.

FIG. 8 is a block diagram of the 8-bit-unit match-total computation unit 23(1).

A register 23(11) stores therein received 64-bit image data in units of 8, bits.

A register 23(12) stores therein 8-bit data at a word end of the previous image data.

Each of EXNOR (match detection) logics 23(13) determines a match between corresponding adjacent pieces of 8-bit data.

Each of 8-bit match counters 23(14), which are match count units, receives data for which a match in units of 8 bits has been detected, to determine the number of matches (the number of matches between adjacent pieces of 8-bit data in units of 8 bits in this case; the same applies in the following descriptions).

An adder 23(15) performs addition for the number of matches determined by the respective 8-bit match counters 23(14) to calculate the sum of matches in a line unit.

A register 23(16) stores therein the sum calculated by the adder 23(15) corresponding to one line.

FIG. 9 is a block diagram of the 16-bit-unit match-total computation unit 23(2).

A register 23(21) stores therein received image data in units of 16 bits.

A register 23(22) stores therein 16-bit data at a word end of the previous image data.

Each of EXNOR (match detection) logics 23(23) determines a match between corresponding adjacent pieces of 16-bit data.

Each of 16-bit match counters 23(24) receives data for which a match in units of 16 bits has been detected, to determine the number of matches.

An adder 23(25) performs addition for the number of matches determined by the respective 16-bit match counters 23(24) to calculate the sum of matches in a line unit.

A register 23(26) stores therein the sum calculated by the adder 23(25) corresponding to one line.

FIG. 10 is a block diagram of the 32-bit-unit match-total computation unit 23(3).

A register 23(31) stores therein received image data in units of 32 bits.

A register 23(32) stores therein 32-bit data at a word end of the previous image data.

Each of EXNOR (match detection) logics 23(33) determines a match between corresponding adjacent pieces of 32-bit data.

Each of 32-bit match counters 23(34) receives data for which a match in units of 32 bits has been detected, to determine the number of matches.

An adder 23(35) performs addition for the number of matches determined by the respective 32-bit match counters 23(34) to calculate the sum of matches in a line unit.

A register 23(36) stores therein the sum calculated by the adder 23(35) corresponding to one line.

FIG. 15 is a block diagram of the 8-bit-unit clipping processing unit 28(1) in FIG. 7.

A register 28(11) stores therein received image data in units of 8 bits.

A MUX 28(12) successively selects data in units of 8 bits stored in the register 28(11). At the time of output, the MUX 28(12) adds 24 bits of "0" value to the selected data to output 32-bit data.

A counter 28(13) successively creates a value to be selected by the MUX 28(12).

FIG. 16 is a block diagram of the 16-bit-unit clipping processing unit 28(2) in FIG. 7.

A register 28(21) stores therein received image data in units of 16 bits.

A MUX 28(22) successively selects data in units of 16 bits stored in the register 28(21). At the time of output, the MUX 28(22) adds 16 bits of "0" value to the selected data to output 32-bit data.

A counter 28(23) successively creates a value to be selected by the MUX 28(22).

FIG. 17 is a block diagram of the 32-bit-unit clipping processing unit 28(3) in FIG. 7.

A register 28(31) stores therein received image data in units of 32 bits.

A MUX 28(32) successively selects data in units of 32 bits stored in the register 28(31).

A counter 28(33) successively creates a value to be selected by the MUX 28(32).

FIG. 18 is a block diagram of the MTF processing unit 29 in FIG. 2.

Data 0 to 15 in FIG. 18 is contents of dictionary stored in registers and numbers 1 to 6 attached to the data 0 to 15 correspond to index values, respectively. An input and an output of adjacent ones of the registers are connected to achieve shifting at the time of update as shown in FIG. 5. Comparators 29(7) to 29(12) compare clipped data with the contents of the dictionary having the index values 1 to 6 and transfer the comparison results to an index generation device 29(13).

The index generation device 29(13) receive the comparison results of the comparators 29(7) to 29(12) and selects the smallest one of the numbers (the index values) that match the data and output the selected one as the index value.

An OR circuit 29(14) receives the comparison results of the comparators 29(7) to 29(12) and generates the match FLAG (=1).

A dictionary-write control device 29(15) receives the index value and controls write of the data 0 through data of the received index value among the data 0 to 15.

FIG. 11 is a block diagram of the quantization device 23(4) in FIG. 6.

An 8-bit quantization device 23(41) masks lower 8 bits among 16 bits of the match total count, that is, sets the lower 8 bits to "0".

A 7-bit quantization device 23(42) quantizes lower 7 bits among the 16-bit match total count to "0".

A 6-bit quantization device 23(43) quantizes lower 6 bits among the 16-bit match total count to "0".

A MUX 23(44) receives a quantization value and selects one of the quantized match total counts of the quantization devices 23(41), 23(42), and 23(43) and the match total non-quantized. For example, when the quantization value is 0, the MUX 23(44) selects the value of the 8-bit quantization device 23(41). When the quantization value is 1, the MUX 23(44) selects the value of the 7-bit quantization device 23(42). When the quantization value is 2, the MUX 23(44) selects the value of the 6-bit quantization device 23(43). When the quantization value is 3, the MUX 23(44) selects the non-quantized match total.

Figure 12:
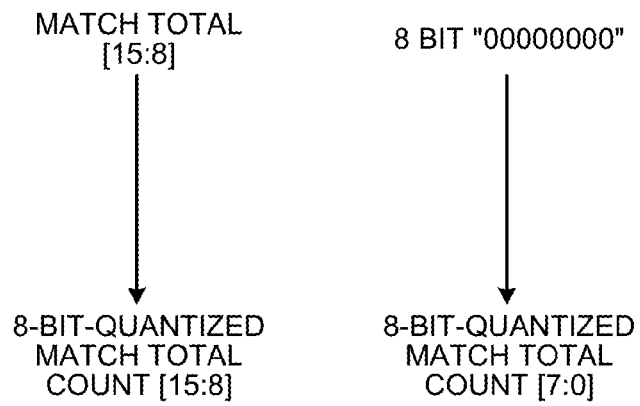
FIG. 12 depicts a processing state of quantization performed by an 8-bit quantization device.

FIG. 12 depicts a processing state of quantization performed by the 8-bit quantization device 23(41). As shown in FIG. 12, lower 8 bits of the 16-bit match total count are quantized to "0".

Figure 13:
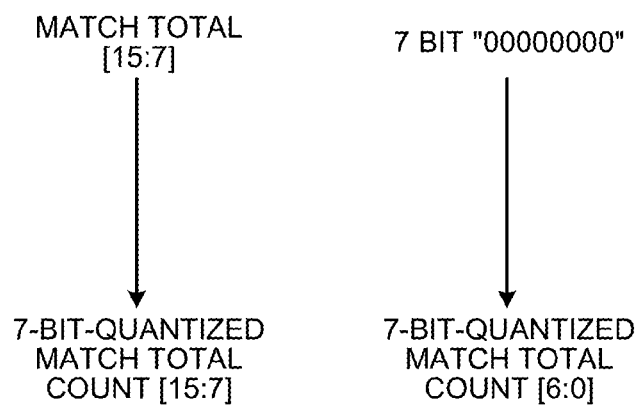
FIG. 13 depicts a processing state of quantization performed by a 7-bit quantization device.

FIG. 13 depicts a processing state of quantization performed by the 7-bit quantization device 23(42). As shown in FIG. 13, lower 7 bits of the 16-bit match total count are quantized to "0".

Figure 14:
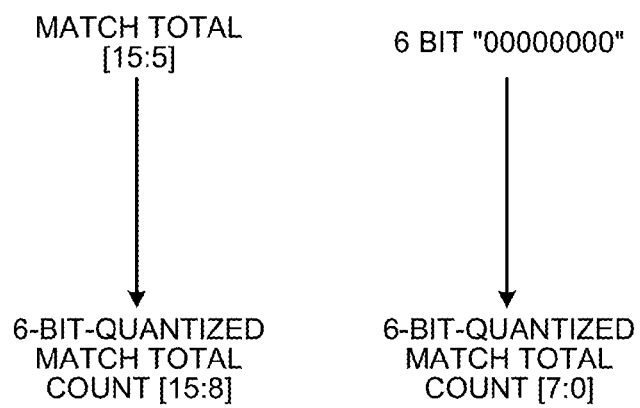
FIG. 14 depicts a processing state of quantization performed by a 6-bit quantization device.

FIG. 14 depicts a processing state of quantization performed by the 6-bit quantization device 23(43). As shown in FIG. 14, lower 6 bits of the 16-bit match total count are quantized to "0".

Figure 19:
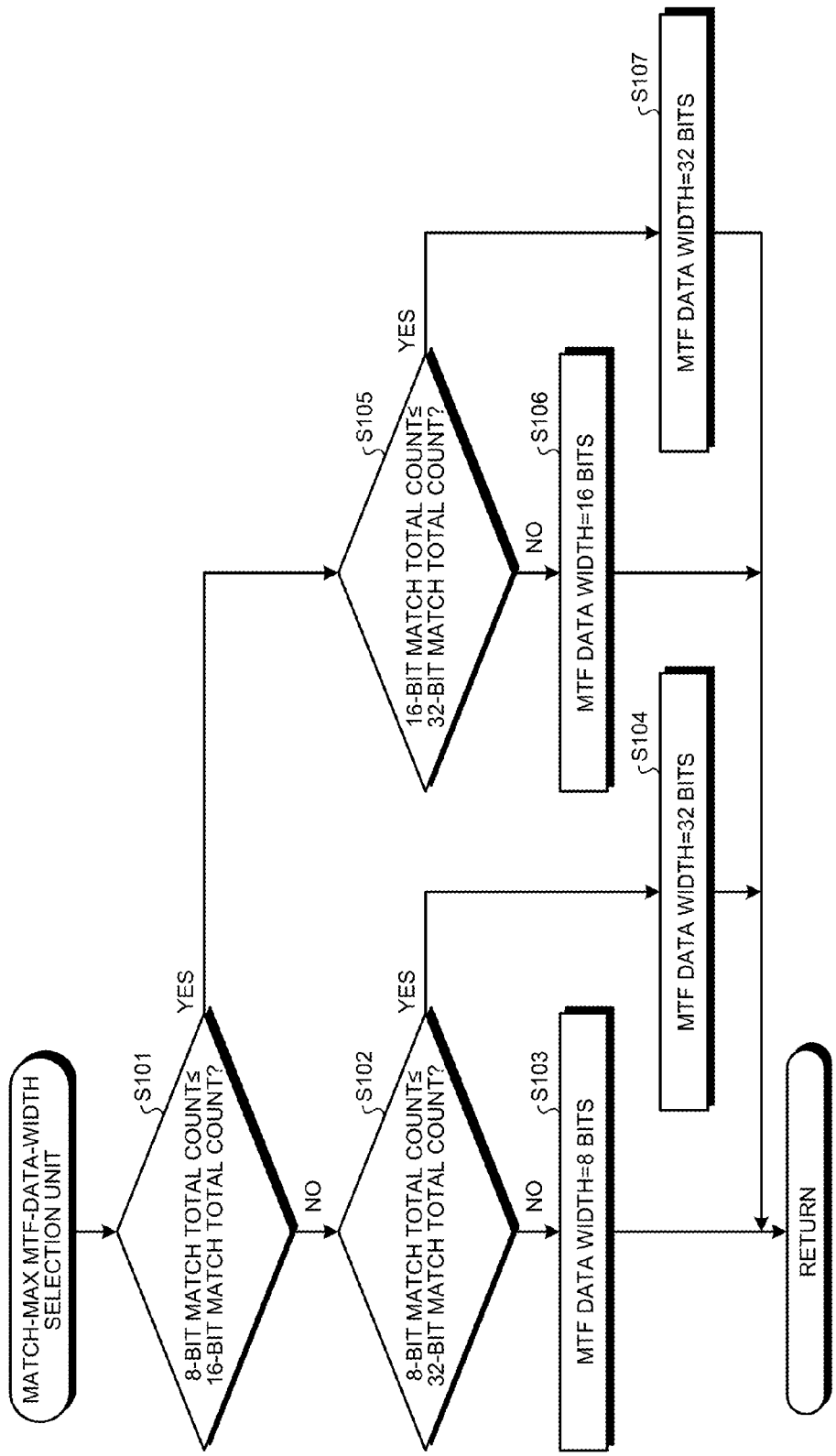
FIG. 19 is a flowchart of a process procedure performed by a match-Max MTF-data-width selection unit in FIG. 6.

FIG. 19 is a flowchart of a process procedure performed by the match-Max MTF-data-width selection unit 23(7) in FIG. 6.

The match-Max MTF-data-width selection unit 23(7) compares the 8-bit match total count and the 16-bit match total count with each other (S101). When these counts are equal or the 16-bit match total count is larger (YES at S101), the process proceeds to Step S105. When the 8-bit match total count is larger than the 16-bit match total count (NO at S101), the process proceeds to Step S102.

At Step S102, the 8-bit match total count and the 32-bit match total count are compared with each other (S102). When these counts are equal or the 32-bit match total count is larger than the 8-bit match total count (YES at S102), the MTF data width is set at 32 bits (S104). When the 8-bit match total count is larger than the 32-bit match total count (NO at S102), the MTF data width is set at 8 bits (S103).

At Step S105, the 16-bit match total count and the 32-bit match total count are compared with each other (S105). When these counts are equal or the 32-bit match total count is larger than the 16-bit match total count (YES at S105), the MTF data width is set at 32 bits (S107). When the 16-bit match total count is larger than the 32-bit match total count (NO at S105), the MTF data width is set at 16 bits (S106). In this way, when the match total counts are equal, a larger period is selected with priority.

FIG. 20 is a flowchart of a procedure of the Huffman coding process performed by the Huffman-coding processing unit 30 in FIG. 2.

That is, whether the data is at the head of a line is determined at Step S201 and, when it is the line head (YES at S201), the line-header coding process is performed (S202) to output the line header shown in FIG. 3 as a code.

Whether the data input in the MTF process of the MTF processing unit 29 in FIG. 2 matches the dictionary is then determined (S203). When a match occurs (YES at S203; HITFLG=1), an index coding process is performed (S204). When no match occurs (NO at S203), an ESC coding process is performed (S205). Whether the data is at the end of the line is then determined (S206) and, when it is the line end (YES at S206), an end coding process is performed to output the code end shown in FIG. 3 as a code (S207).

Figure 21:
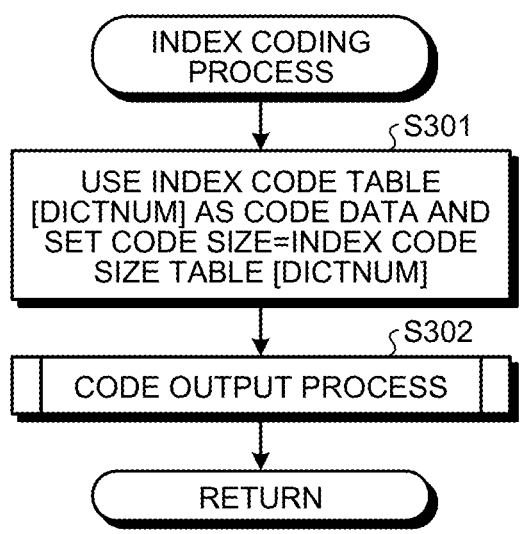
FIG. 21 is a flowchart of a procedure of an index coding process at Step S204 in FIG. 20.

FIG. 21 is a flowchart of a procedure of the index coding process at Step S204 in FIG. 20.

That is, the code and size corresponding to the index value of the code format shown in FIG. 3 are first determined. Specifically, an index code table (DICTNUM) is used as code data and the code size is set to an index size table (DICTNUM) (S301), and then a code output process is performed (S302).

Figure 22:
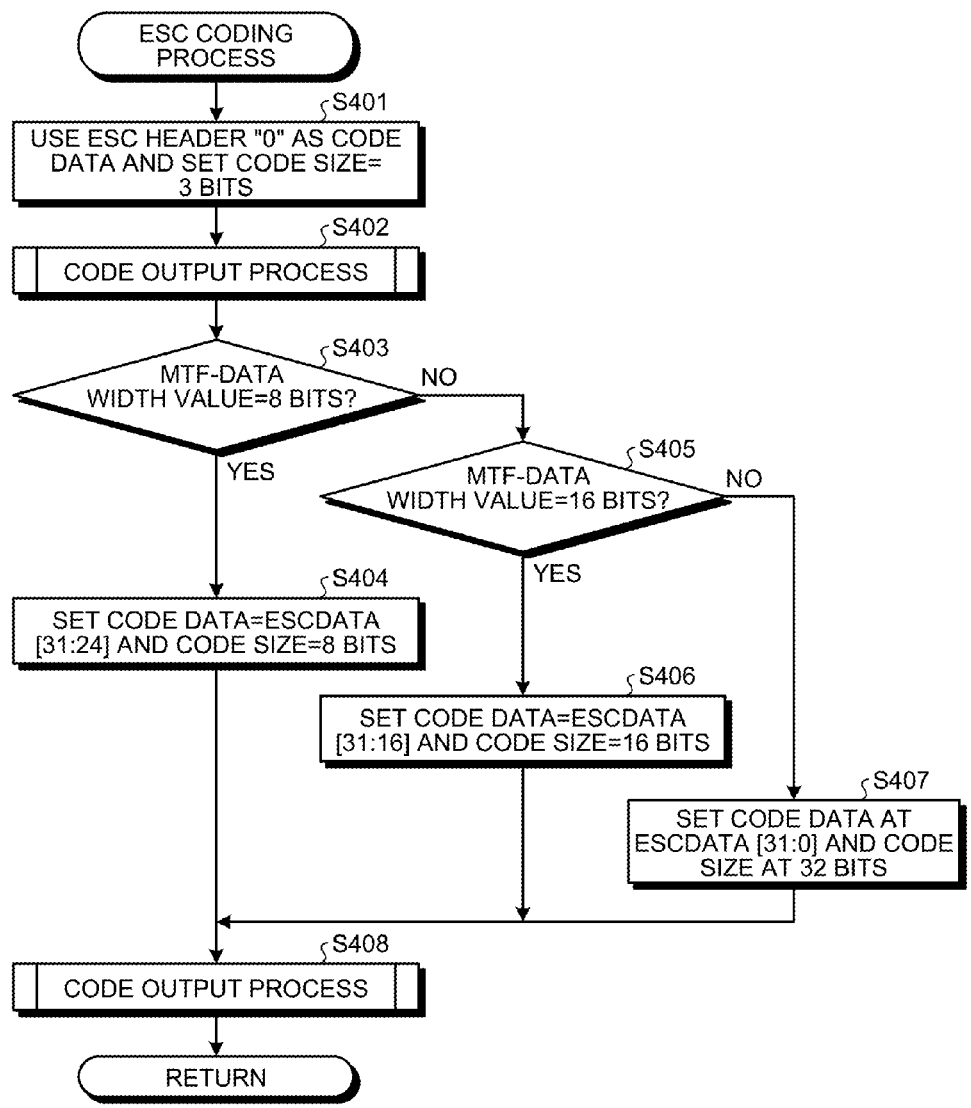
FIG. 22 is a flowchart of a procedure of an ESC coding process at Step S205 in FIG. 20.

FIG. 22 is a flowchart of a procedure of the ESC coding process at Step S205 in FIG. 20.

The code and size corresponding to the ESC header of the code format shown in FIG. 3 are first determined. For example, the ESC header "0" is used as code data and the code size is set at 3 bits (S401) and then the coding output process is performed (S402). When the value of the MTF data width is 8 bits (YES at S403), the code data is set at ESCDATA [31:24] and the code size is set at 8 bits (S404). That is, first 8 bits as the ESCDATA are coded.

When the value of the MTF data width is 16 bits (NO at S403, YES at S405), the code data is set at ESCDATA [31:16] and the code size is set at 16 bits. That is, first 16 bits as the ESCDATA are coded.

When the value of the MTF data width is 32, bits (NO at S403, NO at S405), the code data is set at ESCDATA [31:0] and the code size is set at 32 bits. That is, first 32 bits as the ESCDATA are coded. The code output process is performed last (S408) to end the ESC coding process.

Figure 23:
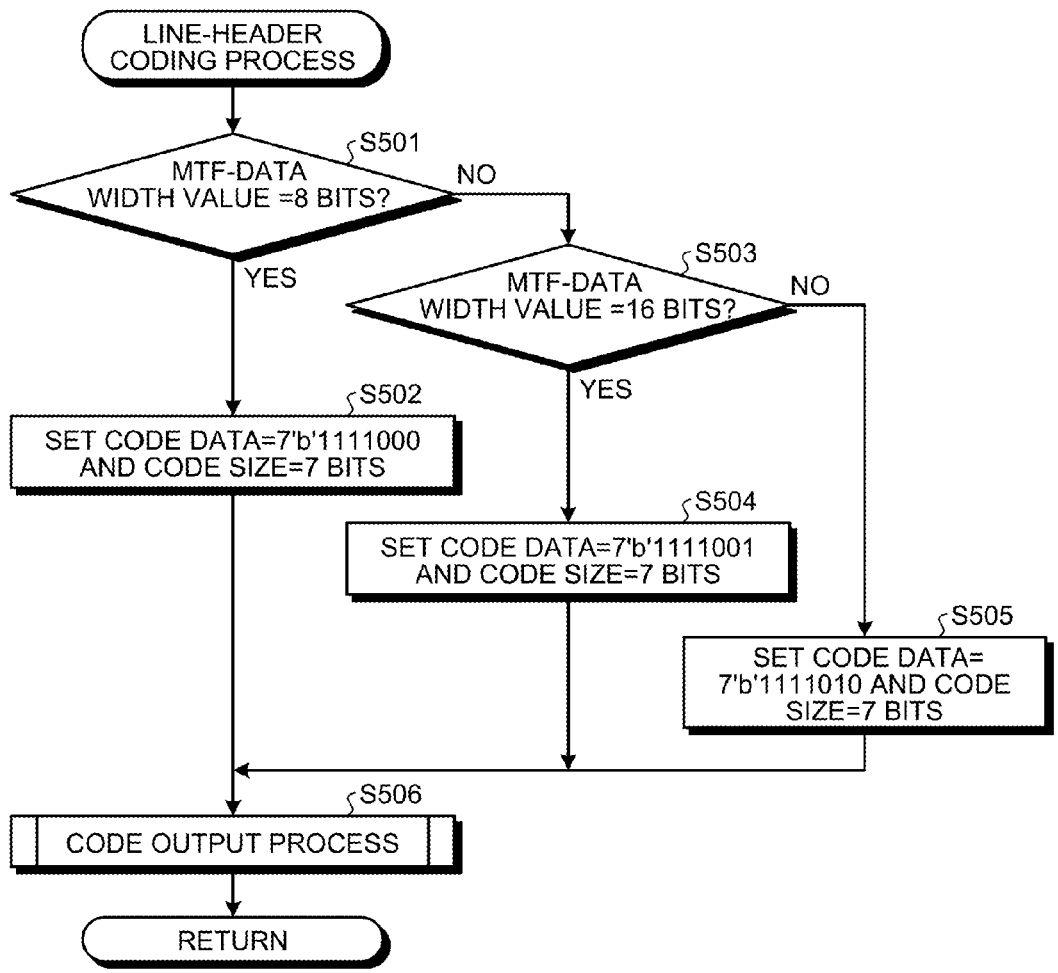
FIG. 23 is a flowchart of a procedure of a line-header coding process at Step S202 in FIG. 20.

FIG. 23 is a flowchart of a procedure of the line-header coding process at Step S202 in FIG. 20.

Whether the MTF-data width value is 8 bits is first determined (S501). When the MTF-data width value is 8 bits (YES at S501), the code data is set at 7'b'1111000 and the code size is set at 7 bits (S502) and then the code output process is performed (S506). When the MTF-data width value is 16 bits (NO at S501, YES at S503), the code data is set at 7'b'1111001 and the code size is set at 7 bits (S504) and then the code output process is performed (S506). When the MTF-data width value is 32 bits (NO at S501, NO at S503), the code data is set at 7'b'1111010 and the code size is set at 7 bits (S505) and then the code output process is performed (S506).

Figure 24:
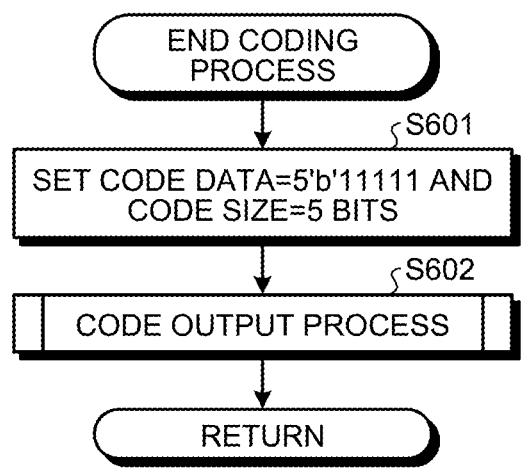
FIG. 24 is a flowchart of a procedure of an end coding process at Step S207 in FIG. 20.

FIG. 24 is a flowchart of a procedure of the end coding process at Step S207 in FIG. 20.

As shown in FIG. 24, the code and size corresponding to the code end of the code format shown in FIG. 3 are determined according to the MTF-data width value (the code data=5'b'11111 and the code size=5 bits in this case) (S601) and then the code output process is performed (S602).

A procedure of packing variable-length codes into a 32-bit codes and outputting a resultant code is explained next.

Figure 25B:
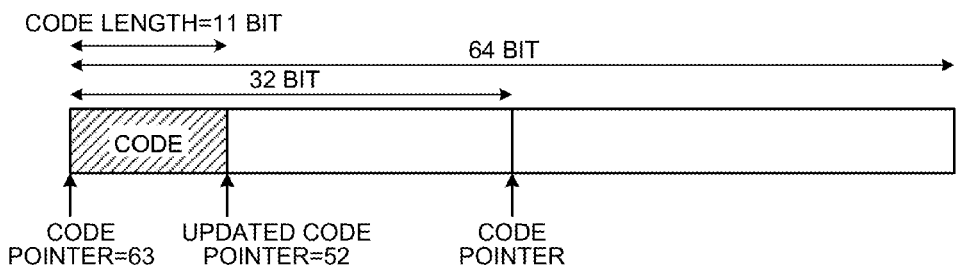
FIGS. 25B to 25E depict a code margin process at Step S702 in a code output process in FIG. 25A.

FIG. 25A is a flowchart of a procedure of the code output process of outputting variable length codes as 32-bit codes. FIGS. 25B to 25E depict a code margin process at Step S702 within a word (64 bits) width in the code output process shown in FIG. 25A.

Figure 25C:
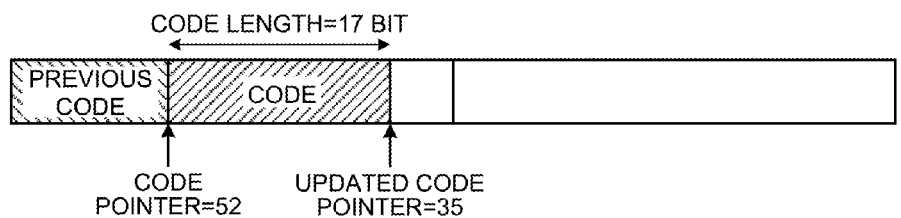

In FIG. 25B, a pointer pointing the position of a 64-bit code is first obtained to determine the left edge of the code shown in FIG. 25B. For example, the code pointer first points the left edge 63 and then 11 bits, which is the code length (the code size), are subtracted from the code pointer and set the code pointer is changed to 52 (S701). A code to be added is then shifted by the updated value of the pointer and is added to the previous code as shown in FIG. 25C. That is, because there is the previous code, the code pointer points 52 and then the code length, which is 17 bits, is subtracted therefrom and the code pointer is changed to 35 after the update (S702) as shown in FIG. 25C.

Figure 25D:
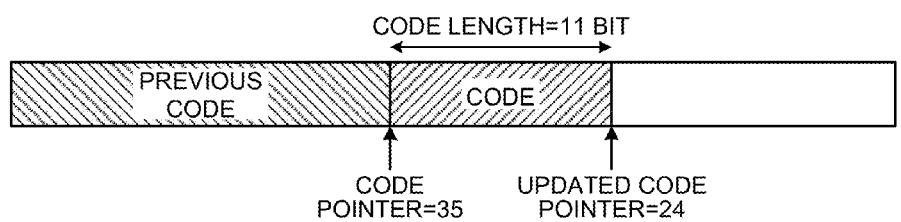
Figure 25E:
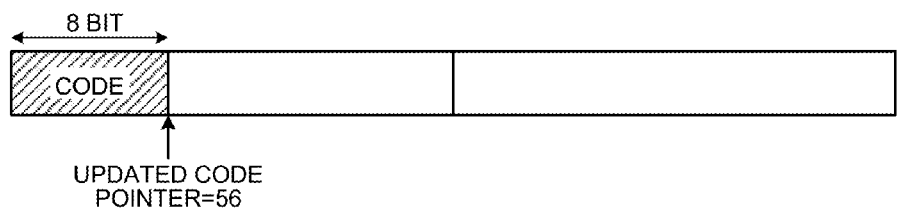
Figure 28:
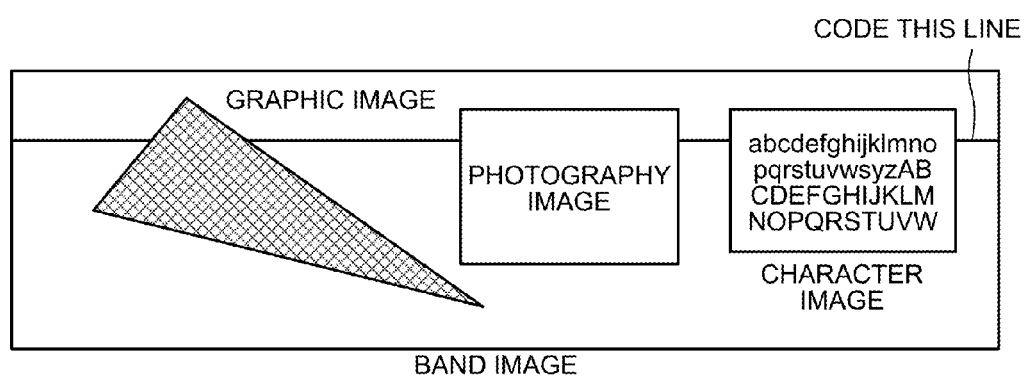
FIG. 28 is an example in which a photographic image, a character image, and a graphic image exist together in one line.

Processes shown in FIGS. 25D and 25E are then performed. That is, in FIG. 25D, the updated code pointer is changed to 24 due to an added code (35 bits) and thus the code pointer is equal to or lower than 32 bits (YES at S703). Accordingly, processes at S704 and subsequent steps are then performed. That is, upper 32 bits are clipped (S704) and output as a code (S705), 32 is added to the code pointer as shown in FIG. 25E (S706) and shift by 32 bits is performed as shown in FIG. 25E (S707), and increment by one is performed for a code in units of 32 bits (S708). In this way, when the code word width (32 bits) is filled with variable-length codes according to the code size and the code, the variable-length codes are packed into a fixed length of 32 bits, then coded, and output.

While the dictionary is based on the MTF algorithm, that is, the dictionary according to the MTF method is used in the embodiment mentioned above, a dictionary according to a First In First OUT (FIFO) method based on a simple FIFO algorithm can be used. This configuration is explained next.

Figure 29:
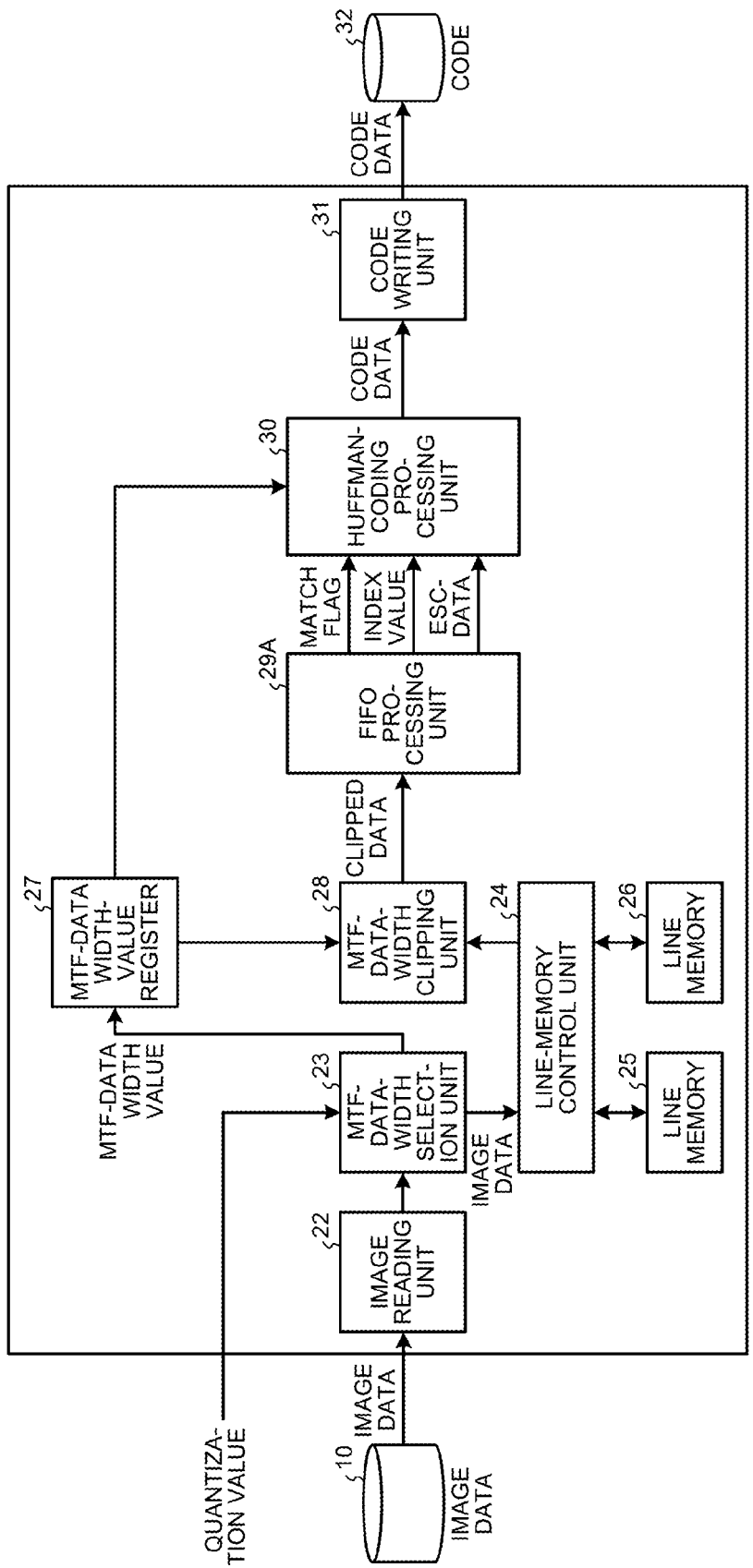
FIG. 29 is a functional block diagram for a coding process performed by the coding device in FIG. 1 based on an FIFO algorithm.

FIG. 29 is a functional block diagram for the coding process performed by the coding device 5 in FIG. 1 based on the FIFO algorithm. In FIG. 29, the MTF processing unit 29 in the functional block diagram of FIG. 2 is replaced with an FIFO processing unit 29A and like components are denoted by like reference numerals.

That is, the main memory 10 stores therein data, image data in this case. A data reading unit, the image reading unit 22 in this case reads the image data from the main memory 10 in units of a predetermined amount, in units of one line in this case and transfers the read image data to a data-period selection unit, the MTF-data-width selection unit 23 in this case. The MTF-data-width selection unit 23 (which is already shown in FIG. 6) receives the image data from the image reading unit 22 and transfers the image data to the line-memory control unit 24 while determining the numbers of matches with respect to respective plural MTF data widths.

The line-memory control unit 24 receives the image data from the MTF-data-width selection unit 23 and writes the image data in the line memories 25 and 26 included in a line-memory storage unit while alternately switching the line memories 25 and 26 for each line. The line memories 25 and 26 receive the image data in units of one line from the line-memory control unit 24 and store the received image data therein.

The MTF-data width-value register 27 that stores therein an MTF-data width value stores therein an MTF data width determined by the MTF-data-width selection unit 23. A data clipping unit, the MTF-data-width clipping unit 28 in this case (which is already shown in FIG. 7) receives the image data from the line-memory control unit 24. The MTF-data-width clipping unit 28 clips the received image data with a width of the MTF-data width value stored in the MTF-data width-value register 27 and transfers the clipped image data to an intermediate-data conversion unit, to the FIFO processing unit 29A in this case.

The FIFO processing unit 29A receives the image data clipped by the MTF-data-width clipping unit 28 and generates a match FLAG (=1), an index value, and ESCDATA, that is, intermediate data for identification in the code table shown in FIG. 3 according to the FIFO algorithm to generate coded data (a Huffman code) in the Huffman-coding processing unit 30 at the next stage.

Specifically, the FIFO processing unit 29A compares the image data clipped by the MTF-data-width clipping unit 28 with the built-in dictionary and determines whether a match occurs. When a match occurs, the FIFO processing unit 29A transfers the index value of the match to a coding processing unit, the Huffman-coding processing unit 30 in this case. When no match occurs, the FIFO processing unit 29A transfers the clipped data as the ESCDATA value.

The Huffman-coding processing unit 30 codes the match FLAG (=1), the index value, and the ESCDATA value received from the FIFO processing unit 29A according to the format shown in FIG. 3, and transfers the coded data to the code writing unit 31. A Huffman coding process procedure performed in the Huffman-coding processing unit 30 is as already shown in FIG. 20.

The code writing unit 31 performs a process of writing a code generated by the Huffman-coding processing unit 30 into a data storage unit that stores therein code data, the memory 32 in this case (image data to be coded is as shown in FIG. 26).

In this way, the image data in units of one line are coded as shown in FIG. 27. The image data is coded in units of one line and the coded image data includes a line header code at the head of each line and a code end at the end of the code as shown in FIG. 27.

Each of the image reading unit 22, the MTF-data-width selection unit 23, the line-memory control unit 24, the MTF-data-width clipping unit 28, the FIFO processing unit 29A, the Huffman-coding processing unit 30, and the code writing unit 31 explained above is also a function realizing unit that can be obtained by causing a computer to read programs.

Figure 30:
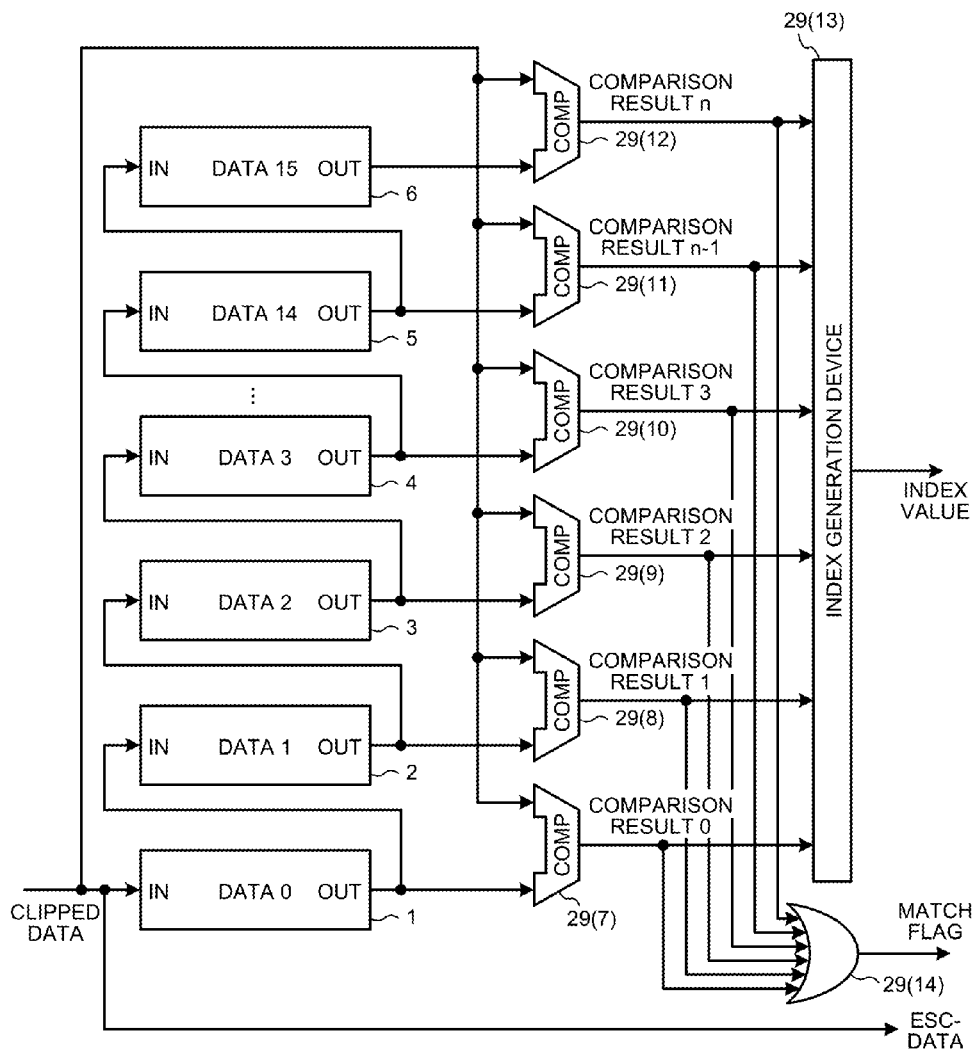
FIG. 30 is a block diagram of an FIFO processing unit.

FIG. 30 is a block diagram of the FIFO processing unit 29A in FIG. 29.

Data 0 to 15 in FIG. 30 is contents of dictionary stored in registers and numbers 1 to 6 attached to the data 0 to 15 correspond to index values, respectively. An input and an output of adjacent ones of the registers are connected to achieve shifting at the time of update as shown in FIG. 31 explained later. Comparators 29(7) to 29(12) compare clipped data with the contents of the dictionary having the index values 1 to 6, respectively, and transfer comparison results to the index generation device 29(13).

The index generation device 29(13) receives the comparison results from the comparators 29(7) to 29(12), selects the smallest one of numbers (index values) for which a match occurs, and outputs the selected number as the index value.

The OR circuit 29(14) receives the comparison results from the comparators 29(7) to 29(12) and generates the match FLAG (=1).

FIG. 31 depicts a dictionary updating process in a FIFO coding process at the time of coding when the MTF data width is 16 bits.

The process performed when the dictionary is searched for input data is as shown in FIG. 4. When compared with dictionary data, input data 0x5555_0000 matches dictionary data having the index value of 13. In the dictionary updating process performed in this case, the input data 0x5555_0000 is inserted into the dictionary at the head having the index value of 0. At the same time, other dictionary data is all shifted as shown by an arrow Y in FIG. 31. In this case, however, unlike the MTF algorithm, the dictionary data 0x5555_0000 having the index value of 13 is kept from being deleted (FIG. 31 depicts data after shifting and data having the index value of 15 before shifting shown in FIG. 4 is discarded).

FIG. 32 is an example of the difference in the MAX period (that means a period with which the number of matches between input data and dictionary words is the largest) caused by changing the quantization value.

FIG. 32 is a table of the numbers of matches between input data and words in the dictionary in the case of an 8-bit period, a 16-bit period, and a 32-bit period when the quantization is not performed and when the quantization is performed (that is, when lower 8 bits, 7 bits, or 6 bits are masked with "0").

As shown in FIG. 32, when lower 8 bits, 7 bits, or 6 bits of the non-quantized numbers of matches in the respective periods are masked with "0", the numbers in all the periods have the same value in the case (i) of quantization of lower 8 bits. Accordingly, the MAX period in this case is the 32-bit period, which indicates that it is preferable to compress data at 32 bits/clock. That is, the data can be compressed at 32 bits/clock while the compression ratio is somewhat reduced. In the case (ii) of quantization of lower 7 bits, the numbers in the 8-bit period and the 16-bit period have the same value. Accordingly, the MAX period is the 16-bit period, which indicates that it is preferable to compress data at 16 bits/clock. However, the compression ratio is subtly reduced. In the case (iii) of quantization of lower 6 bits, the numbers of matches in the 8-bit period, the 16-bit period, and the 32-bit period are 704, 640, and 512, respectively, and thus the tendency is the same as that in the case of no quantization, which means that the Max period is the 8-bit period. This indicates that it is preferable to compress data at 8 bits/clock. While the compression ratio is not reduced in this case, the compression speed is lower than those in the cases of the 32-bit period and 16-bit period.

The balance between the compression ratio and the speed (the compression speed) is adjusted by changing the quantization value in this way. In such a case, in a printer having a larger memory, the compression speed can be increased while the compression ratio may be somewhat reduced by increasing the quantization value. In a printer having a smaller memory, a choice such as decreasing the quantization value (or not performing the quantization) to keep the compression speed without reducing the compression ratio is possible.

As described above, according to the present embodiment, matches are counted in a plurality of periods. The values of the match counts are quantized (lower bits of the values of the match counts are masked), thereby causing the numbers of matches to be the same value when the difference between the numbers of matches is small and selecting the value in a larger period when the numbers of matches have the same value. Accordingly, when the difference in the values of the match counts in the respective periods is small, the difference is not considered, so that the data can be coded with as long a period as possible to increase the coding rate.

According to the embodiment, data can be coded with as long a period as possible among periods with which input data and dictionary data matches the most, thereby further increasing the coding rate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing device that codes data, comprising:
a data reading unit that reads a predetermined amount of data stored in a data storage unit;
a data-period selection unit that selects a data period for the read data by performing a data period detection operation on the read data in units of the predetermined amount of data;
a data clipping unit that clips data from the read data with the data period selected by the data-period selection unit;
an intermediate-data conversion unit that converts the clipped data into intermediate data; and
a coding processing unit that codes the intermediate data converted by the intermediate-data conversion unit,
wherein,
the data-period selection unit is configured to divide the read data in units of respective predetermined periods,
the data-period selection unit has a match count unit that is configured to obtain count values of matches in data between pieces of the divided data,
the data-period selection unit includes a quantization unit configured to quantize the count values of matches in data, and
the quantization unit is configured to,
select one of the periods of divided data that provides a largest one of the quantized count values of matches obtained by the match count -unit, or
select, when some of the quantized count values are the same,
a largest one of the periods that provide a same count value.

2. The data processing device according to claim 1, wherein the quantization unit is configured to quantize the count values of matches in data by removing a reference number of least significant bits from each of the count values of matches in data, such that a difference between magnitudes of a pair of count values, from among the count values of the matches in data, is removed with respect to a pair of quantized values generated by quantizing the pair of count values, if the difference between the magnitudes of the pair of count values is below a threshold value.

3. The data processing device according to claim 1, wherein the intermediate-data conversion unit is configured to coverts the data with the largest period selected by the data-period selection unit.

4. The data processing device according to claim 1, wherein the intermediate-data conversion unit includes a dictionary, and is configured to converts input data into intermediate data that reflects a match or a mismatch between the input data and dictionary data of the dictionary.

5. The data processing device according to claim 4, wherein the dictionary is a dictionary of a Move-To-Front (MTF) method or a First In First OUT (FIFO) method.

6. The data processing device according to claim 1, wherein the coding processing unit is a Huffman-coding processing unit configured to performs Huffman coding on the intermediate data.

7. The data processing device according to claim 1, wherein the data-period selection unit has a match counter that is configured to,
   divide data of one word into plural pieces of data with predetermined data widths,
   count matches in data between pieces of divided data, and
      select one of the data widths that provides a largest one of total count values of the match counter for a same number of words, or
      select, when some of the count values are the same, a largest one of the data widths of divided data that provide the same count value, as a data width for clipping.

8. The data processing device according to claim 1, wherein the quantization unit is configured such that a quantization value used by the quantization unit to quantize the count values of matches is selectable from among a plurality of quantization values supported by the quantization unit.

9. A data processing method performed in a data processing device that codes data, the data processing method comprising:
   a data reading step of reading a predetermined amount of data stored in a data storage unit;
   a data-period selection step of selecting a data period for the read data by performing a data period detection operation on the read data in units of the predetermined amount of the data;
   a data clipping step of clipping data from the read data with the data period selected at the data-period selection step;
   an intermediate-data conversion step of converting the clipped data into intermediate data; and
   a coding processing step of coding the intermediate data converted at the intermediate-data conversion step,
   wherein
      the data-period selection step includes dividing the read data in units of respective predetermined periods,
      the data-period selection step includes a match count step of obtaining count values of matches in data between respective pieces of the divided data,
      the data-period selection step includes a quantization step of quantizing the count values of matches in data, and
      the quantization step includes,
         selecting one of the periods of divided data that provides a largest one of the quantized count values of matches obtained at in the match count step, or
         selecting, when some of the quantized count values are same, a largest one of the periods that provide a same count value.

10. A computer program product comprising a non-transitory computer-usable medium having computer-readable program codes embodied in the medium, wherein the program codes when executed causes a computer to execute a data processing method performed in a data processing device that codes data, the data processing method comprising:
   a data reading step of reading a predetermined amount of data stored in a data storage unit;
   a data-period selection step of selecting a data period for the read data by performing a data period detection operation on the read data in units of the predetermined amount of the data;
   a data clipping step of clipping data from the read data with the data period selected at the data-period selection step;
   an intermediate-data conversion step of converting the clipped data into intermediate data; and
   a coding processing step of coding the intermediate data converted at the intermediate-data conversion step,
   wherein
      the data-period selection step includes dividing the read data in units of respective predetermined periods,
      the data-period selection step includes a match count step of obtaining count values of matches in data between respective pieces of the divided data,
      the data-period selection step includes a quantization step of quantizing the count values of matches in data, and
      the quantization step includes,
         selecting one of the periods of divided data that provides a largest one of the quantized count values of matches obtained at the match count step, or
         selecting, when some of the quantized count values are same, selecting a largest one of the periods that provide a same count value.

* * * * *